US010212548B2

(12) United States Patent
Kokkonen

(10) Patent No.: US 10,212,548 B2
(45) Date of Patent: *Feb. 19, 2019

(54) SYSTEMS AND METHODS TO DETERMINE THE LOCATIONS OF PACKAGES AND PROVIDE NAVIGATIONAL GUIDANCE TO REACH THE PACKAGES

(71) Applicant: OneMarket Network LLC, San Francisco, CA (US)

(72) Inventor: Erik Davin Kokkonen, San Francisco, CA (US)

(73) Assignee: OneMarket Network LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,228

(22) Filed: Dec. 29, 2017

(65) Prior Publication Data
US 2018/0124571 A1 May 3, 2018

Related U.S. Application Data

(63) Continuation of application No. 15/158,102, filed on May 18, 2016, now Pat. No. 9,894,483.
(Continued)

(51) Int. Cl.
*H04W 4/02* (2018.01)
*H04W 4/04* (2009.01)
(Continued)

(52) U.S. Cl.
CPC ............ *H04W 4/023* (2013.01); *G05D 1/028* (2013.01); *G06Q 30/0639* (2013.01);
(Continued)

(58) Field of Classification Search
CPC ....... H04W 4/008; H04W 4/02; H04W 4/043; H04W 4/023; H04W 4/021; H04W 4/025;
(Continued)

(56) References Cited

U.S. PATENT DOCUMENTS 8,179,816 B1   5/2012   Vaidyanathan et al.
8,781,502 B1   7/2014   Middleton et al.
(Continued)

FOREIGN PATENT DOCUMENTS

TW   201024936 A   7/2010
WO   2014065540 A1   5/2014
WO   2015049660 A1   4/2015

OTHER PUBLICATIONS

"U.S. Appl. No. 15/158,102, Ex Parte Quayle mailed Mar. 29, 2017", 9 pages.
(Continued)

*Primary Examiner* — Daniel Lai
(74) *Attorney, Agent, or Firm* — Kwan & Olynick LLP

(57) ABSTRACT

Systems and methods to provide navigational guidance to reach a package located inside a building. Low-energy wireless transmitting devices (e.g., Bluetooth devices) are used to transmit their identifiers. Some of the devices are placed at known locations inside the building; and some of the devices are attached to packages. When a mobile device detects the identifier of a device placed at a known location and the identifier of a device attached to the package, the location of the package is identified and recorded based on the known location of the device. Navigational guidance is provided to a mobile device of a user to reach the package based on the recorded location of the package and/or the location of any of the devices the mobile device can detect within the communication range from the current location of the mobile device.

20 Claims, 9 Drawing Sheets

Related U.S. Application Data

(60) Provisional application No. 62/328,765, filed on Apr. 28, 2016.

(51) Int. Cl.
| | |
|---|---|
| *H04W 64/00* | (2009.01) |
| *G06Q 30/06* | (2012.01) |
| *G05D 1/02* | (2006.01) |
| *H04W 4/80* | (2018.01) |
| *H04W 4/30* | (2018.01) |

(52) U.S. Cl.
CPC ............ *H04W 4/043* (2013.01); *H04W 4/30* (2018.02); *H04W 4/80* (2018.02); *H04W 64/00* (2013.01); *G05D 2201/0216* (2013.01); *Y10S 901/01* (2013.01)

(58) Field of Classification Search
CPC ....... H04W 4/06; H04W 64/00; H04W 4/006; H04W 4/04; H04W 4/185; H04W 84/005; H04W 4/80; H04W 40/244; H04W 4/33; H04W 4/30; H04W 4/38; H04W 12/08; H04W 88/02; H04W 12/00; H04W 24/04; H04W 4/00; H04W 4/029; H04W 40/20; H04W 4/08; H04W 64/003; G06K 2017/0045; G06K 2017/0051; G06Q 10/087; G06Q 10/0833; G06Q 30/0639; G01S 1/68; G01S 5/0226; G01S 19/13; G01S 17/46; G01S 17/66; G01S 13/878; G01S 13/89; G01S 19/51; G01S 1/02; G01S 1/047; G01S 3/12; G01S 7/411

See application file for complete search history.

(56) References Cited

U.S. PATENT DOCUMENTS

| | | |
|---|---|---|
| 9,204,257 B1 | 12/2015 | Mendelson |
| 9,246,573 B1 | 1/2016 | Gettings et al. |
| 9,411,337 B1 | 8/2016 | Theobald et al. |
| 9,527,217 B1 | 12/2016 | Lowy |
| 2002/0198656 A1 | 12/2002 | Ford et al. |
| 2005/0054332 A1 | 3/2005 | Sakagami et al. |
| 2005/0097005 A1 | 5/2005 | Fargo |
| 2007/0018811 A1 | 1/2007 | Gollu |
| 2008/0077511 A1 | 3/2008 | Zimmerman |
| 2008/0112378 A1 | 5/2008 | Twitchell |
| 2009/0149992 A1 | 6/2009 | Ohno |
| 2009/0212921 A1 | 8/2009 | Wild et al. |
| 2009/0265251 A1 | 10/2009 | Dunlap et al. |
| 2010/0094463 A1 | 4/2010 | Okabayashi et al. |
| 2012/0087212 A1 | 4/2012 | Vartanian et al. |
| 2012/0173018 A1 | 7/2012 | Allen et al. |
| 2012/0173139 A1 | 7/2012 | Judd et al. |
| 2012/0226467 A1 | 9/2012 | Miller et al. |
| 2013/0317642 A1 | 11/2013 | Asaria et al. |
| 2014/0101885 A1 | 4/2014 | Ko |
| 2014/0163867 A1 | 6/2014 | Fernandez |
| 2014/0222685 A1 | 8/2014 | Middleton et al. |
| 2014/0244094 A1 | 8/2014 | Kim et al. |
| 2014/0277691 A1 | 9/2014 | Jacobus et al. |
| 2015/0100461 A1 | 4/2015 | Baryakar et al. |
| 2015/0221013 A1 | 8/2015 | Rinicell et al. |
| 2015/0242806 A1 | 8/2015 | Cousins et al. |
| 2015/0271641 A1 | 9/2015 | Sung |
| 2016/0029160 A1* | 1/2016 | Theurer ............... G06F 19/327 455/456.1 |
| 2016/0048796 A1 | 2/2016 | Todasco |
| 2016/0129597 A1 | 5/2016 | Wang et al. |
| 2017/0013409 A1 | 1/2017 | Cerchio et al. |
| 2017/0028564 A1 | 2/2017 | Lowy |
| 2017/0318422 A1 | 11/2017 | Kokkonen |

OTHER PUBLICATIONS

"U.S. Appl. No. 15/158,102, Notice of Allowence dated Oct. 4, 2017", 5 pages.

"European Patent Application No. 16181530.3, European Search Report dated Dec. 8, 2016", 7 pages.

"European Patent Application No. 16177365.1, ESR dated Dec. 7, 2016", 10 pages.

\* cited by examiner

SYSTEMS AND METHODS TO DETERMINE THE LOCATIONS OF PACKAGES AND PROVIDE NAVIGATIONAL GUIDANCE TO REACH THE PACKAGES

RELATED APPLICATIONS

This application is a continuation of and claims benefit under 35 U.S.C. § 120 to U.S. application Ser. No. 15/158,102, filed May 18, 2016 and titled "SYSTEMS AND METHODS TO DETERMINE THE LOCATIONS OF PACKAGES AND PROVIDE NAVIGATIONAL GUIDANCE TO REACH THE PACKAGES", which claims priority to the Prov. U.S. Pat. App. Ser. No. 62/328,765, filed Apr. 28, 2016 and entitled "SYSTEMS AND METHODS TO DETERMINE THE LOCATIONS OF PACKAGES AND PROVIDE NAVIGATIONAL GUIDANCE TO REACH THE PACKAGES", both of which are hereby incorporated herein by reference.

The present application relates to U.S. patent application Ser. No. 15/040,938, filed Feb. 10, 2016 and entitled "Systems and Methods to Provide Searchable Content Related to a Plurality of Locations in a Region in Connection with Navigational Guidance to the Locations in the region", U.S. patent application Ser. No. 14/946,635, filed Nov. 19, 2015 and entitled "Robotic Systems and Methods", and Prov. U.S. Pat. App. Ser. Nos. 62/192,795 and 62/190,690, filed Jun. 15, 2015 and Jul. 9, 2015 respectively and both entitled "Systems and Methods to Determine a Location of a Mobile Device", the entire disclosures of which applications are hereby incorporated herein by reference.

FIELD OF THE TECHNOLOGY

At least some embodiments of the present disclosure relate to robots, location determination, and/or the presentation of location dependent information.

BACKGROUND

U.S. Pat. App. Pub. No. 2009/0149992 discloses a robot capable of traveling within a predetermined pathway area.

U.S. Pat. App. Pub. No. 2010/0094463 discloses a robot having a position recognition section that recognizes a current position of the robot within a guide zone. The robot is controlled to move to each of guide locations in the guide zone. At each of the guide locations, the robot transmits contents information corresponding to the guide location to a mobile terminal held by a person to be guided near the robot.

U.S. Pat. App. Pub. No. 2009/0265251 discloses a search technology for a defined area, such as a shopping mall, where a search interface allows a user to search for products for sale in the stores in the shopping mall and present graphical objects, such as markers, to indicate on the map the stores that have the products in the search results.

U.S. Pat. App. Pub. No. 2005/0097005 discloses an Internet enhanced local shopping system in which a searchable database stores the data identifying the inventories and geographical locations of physical stores so that shoppers can find stores in their area to purchase products and services they desire.

U.S. Pat. No. 8,179,816 discloses an indoor positioning system using a narrowband radio frequency transceiver and discussed a number of other indoor positioning systems. For example, some systems use power-of-arrival (PoA) from a set access points in accordance with IEEE 802.11 for wireless local area networks to determine the location of a mobile device. For example, some systems use Time-of-flight (ToF) of signals from or to satellites or base-stations to convert the arrival time to distances in view of the propagation speed of signals.

U.S. Pat. App. Pub. No. 2012/0226467 discloses an inertial navigation unit that utilizes multiple accelerometers to gather specific force data for improvement of the initialization, navigation, assistance, or corrective processes.

U.S. Pat. App. Pub. No. 2002/0198656 discloses an Inertial GPS navigation system that has a GPS sub-system and an inertial sub-system. If the receiver loses GPS satellite signals, the receiver utilizes the inertial position, velocity and covariance information to speed up GPS satellite signal re-acquisition and associated ambiguity resolution operations.

U.S. Pat. App. Pub. No. 2012/0173139 discloses the use of magnetic fingerprint of locations to estimate the position of a navigation device.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
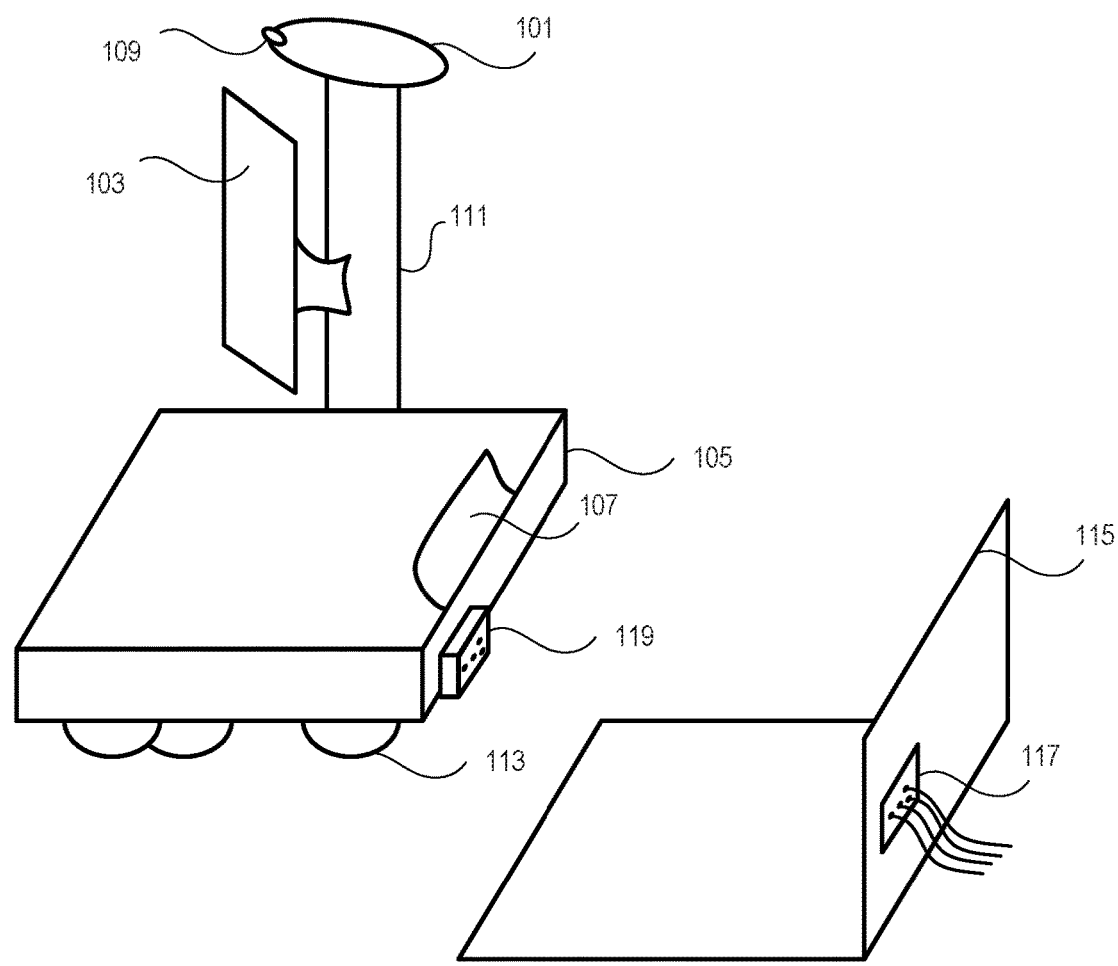
FIG. 1 shows a robot according to one embodiment.

FIG. 1 shows a robot according to one embodiment.

In FIG. 1, a robot (101) includes a base (105), a body (111), a touch screen (103) and a camera (109). In one embodiment, the robot (101) is programmable to travel within an area, such as a shopping mall, capture information and/or photo images, provide a user interface for interaction, and/or transport items.

In FIG. 1, the camera (109) is mounted directly on the body (111). In some alternative embodiments, the camera (109) is integrated with the touch screen (103). For example, the touch screen (103) can be implemented using a tablet computer having a camera (109) and running an operating system for mobile devices; and a mobile application running in the tablet computer is configured to control the operations of the robot (101). In some embodiments, the computer configured to control the operations of the robot (101) is integrated within the body (111) or the base (105). In some embodiments, the robot (101) includes a wireless communications device (e.g., an antenna and a transceiver for a wireless local area network, or a wireless personal area network) for a communication connection to a remote server.

In FIG. 1, the robot (101) has a touch screen (103) within which a controller of the robot (101) may be installed. Alternatively, the controller of the robot (101) may be disposed within the body (111) or the base (105).

In FIG. 1, the base (105) of the robot (01) includes a moving mechanism (113) controllable to move the robot (101) in a pathway area, such as the hallways in a shopping mall, or a sidewalk of a strip mall. For example, the moving mechanisms disclosed in U.S. Pat. App. Pub. No. 2009/0149992 or 2010/0094463 can be used, the disclosure of which is incorporated herein by reference.

In one embodiment, the moving mechanism (113) in the base (105) of the robot (101) is configured to rotate the robot (101) as a whole about a vertical line at a location to allow the camera (109) to take a 360 degree photo image of the surrounding.

In one embodiment, the base (105) and the body (111) are configured to allow the body (111) to rotate about a vertical line passing through the center of the base (105). Thus, the base (105) can be controlled to stay at location; and the body (111) can be controlled to rotate about the vertical line to take a 360 degree photo image of the surrounding. In a further embodiment, the camera (109) is mounted on a track on the body (111) and configured to move alone the track to take a 360 degree photo image of the surrounding.

The 360 degree photo image can be obtained via a camera taking a plurality of photo images while rotating about the vertical line and then digitally stitching the images together to form a photo image having a 360 degree view of the surrounding at the location of the robot (101).

Alternatively, the camera may capture one or more vertical lines of image pixels at a time while the robot (101) rotates about the vertical axis. The vertical lines captured at different time instances while the robot (101) is at different angles with respect to the vertical axis form an image having the 360 degree view of the surrounding.

In one embodiment, the robot (101) (or a server) is configured to analyze the image to extract information about the location, such as the advertisements, notices and/or deals posted on the store front of a retailer, the number of customers in the surrounding area, etc.

In one embodiment, the robot (101) further includes storage spaces (107) configured to carry items for delivery by the robot (101). Items stored in the storage spaces (107) can be secured with a locked door or latch to prevent theft, unauthorized access, temper, etc.

Figure 3:
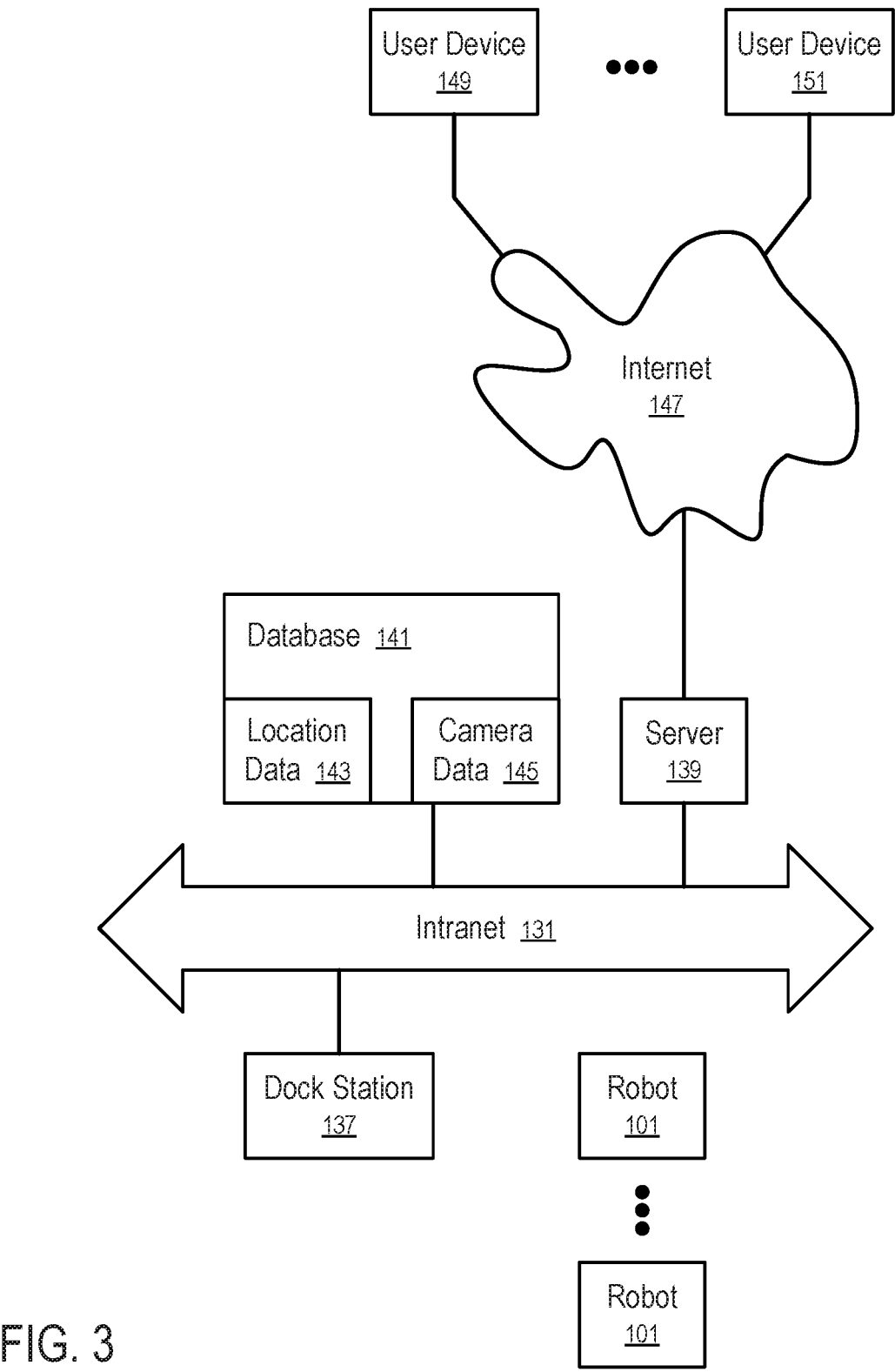
FIG. 3 shows a robotic system according to one embodiment.

In FIG. 1, the robot (101) has a connector (119) configured to be connected with the receptacle (117) of the dock station (137) to provide a wired connection to charge the battery of the robot (101) and/or provide a communication link for transferring data and/or instructions between the robot (101) and a server (e.g., as further illustrated in FIG. 3).

In one embodiment, the robot (101) includes an indoor position determination system that determines the position of the robot (101) within a building structure, such as a shopping mall. The controller of the robot (101) also includes map data of the shopping mall to guide the robot (101) to one or more locations programmed into the robot via a wired or wireless communication connection.

Figure 2:
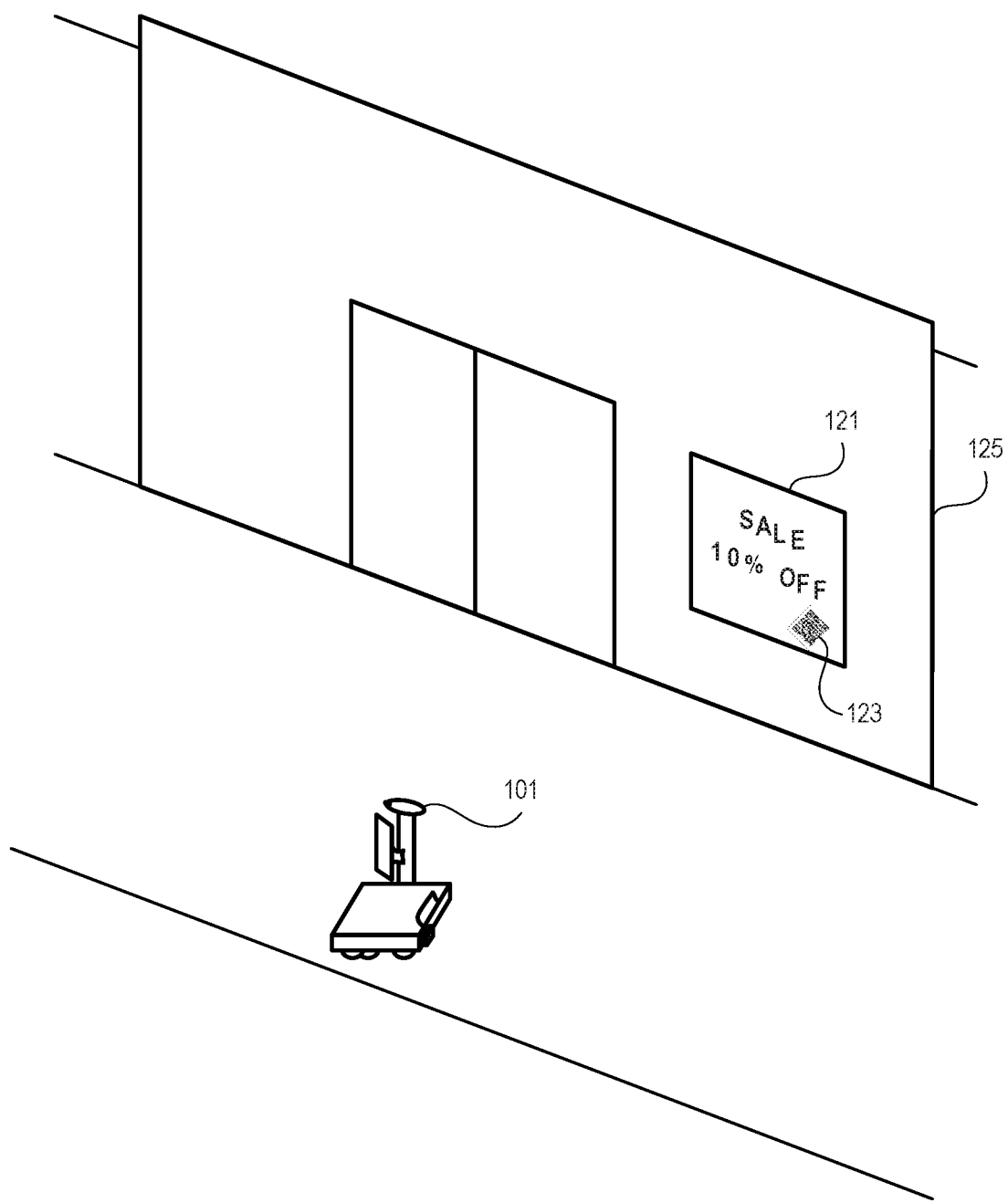
FIG. 2 illustrates an application of a robot according to one embodiment.

FIG. 2 illustrates an application of a robot according to one embodiment.

In FIG. 2, the robot (101) is configured to move inside a shopping mall. The robot (101) is instructed to take a 360 degree photo image of the surrounding at a location near a store front (125) and/or other locations near or in the store. For example, the store front (125) may have a posting (121) announcing a deal, such as a sales event, a discount offer, etc. The 360 degree photo image captured using the camera (109) of the robot (101) includes an image of the posting (121).

In one embodiment, optical character recognition (OCR) is performed on the image to extract the content of the posting. The postings may be filtered based on keywords, such as "sale" or "off", to obtain postings of a particular type, such as discount offers.

In one embodiment, the posting (121) may include a bar code (123); and the image of the bar code (123), as captured in the 360 degree photo image, is processed to determine the content of the bar code (123). For example, the bar code (123) may provide information about the posting (121) and/or an address of a web page from which further information about the posting (121) can be obtained.

Thus, the robot (101) can be instructed to move from a store front to another in a shopping mall, and take photo images that may contain the postings provided by the stores in the shopping mall. The images are processed by the robot (101) (or a server) to extract identify postings of interest, such as discount offers.

In one embodiment, the robot (101) is used to bring consumers, retailers, and technology partners together in ways that enhance the shopping experience. Specifically, the robot (101) can be used to capture data to allow customers to find and purchase products.

For example, the robot (101) can be used to make product catalogs available for search on web and mobile, such as the integration of real time inventory feeds from retailers to offer product availability for each store. The robot (101) can be used to capture offer and product availability information using the camera (109) mounted on the robot (101).

For example, the robot (101) can further be used to assist product purchase and fulfillment. The robot (101) can be used to deliver goods to a central location for fulfillment. For example, in services such as hands free shopping and centralized fashion lounge, the customers can try on clothing from several different retailers in one location, after the robot (101) collects the goods from different retailers in a shopping mall and delivery the collected goods to the current retailer location of the customer.

For example, a customer may order the goods from retailers in a shopping mall via phone or internet; and the robot (101) can be used to collect the goods from the retailers and transport the goods to a logistics partner which further delivers the goods to the customer. Alternatively, the collected goods can be placed in a centralized pickup location in the shopping mall, where the customer can pick up the goods ordered from different retailers in the mall.

For example, when the robot (101) visits a retailer in a shopping mall, a person in the retailer store may interact with the robot (101) on behalf of the retailer. The touch screen (103) provides a user interface that communicates to the persons items to be placed inside the storage space (107) of the robot (101) and/or retrieved from the storage space (107). Thus, the robot (101) can transport goods from and/or to the retailer.

Further, the robot (101) may receive offers and/or product inventory information from the representative of the retailer. For example, a computing device of the representative (e.g., a smart phone, a tablet computer, a computer having a dock station) can be used to transmit the information to the robot (101) via a wireless or wired connection.

The robot (101) may automatically obtain certain offers and/or product inventory information via the camera (109) taking photo images of postings inside the store and/or the store front of the retailer.

In some embodiments, the robot (101) takes still images and/or video images of the retailer location to provide an updated feed of the arrangement and display of goods in the retailer store. Thus, the still images and the video images can be organized as a virtual tour of the retailer store accessible via internet.

In one embodiment, a user may use a mobile computing device (e.g., a smart phone, a digital media player, a tablet computer) to do "Hands Free Shopping" in which the user does not have to carry the items to be purchased and/or have been purchased around the shopping mall. The user may use the mobile computing device to select the items of interest for purchase. The mobile computing device (e.g., having a mobile application running therein) communicates the list of items purchased by the user to the computing system of the retailer (or a centralized server for the shopping mall). Based on the list of items received from the mobile computing device, the robot (101) travels to the stores in the mall, collects from the stores the items purchased by the user, and transports the items at a convenience location for pickup, such as in a pickup area in the parking lot.

In one embodiment, the robot (101) is used to capture images of offline information for the indexing of the offline information in the real world. For example, the robot (101) can be used to capture various types of data, from product information and availability to safety and security hazards within the shopping mall.

In one embodiment, the robot (101) has a cellular communications transceiver integrated within the touch screen (103), or disposed in the body (111). A communication link provided by the cellular communications transceiver can be used for the communication between the robot (101) and a remote server to process images, retrieve data, control the movement of the robot (101), and/or provide access to the storage spaces (107).

In one embodiment, the robot (101) has a position determination system configured to determine its position inside the shopping mall. The robot (101) is configured to identify the retailer stores based on its location within the shopping mall and/or beacon signals from the devices disposed in the retailer stores.

The robot (101) includes a wireless local area network transceiver (e.g., a WiFi transceiver). The robot (101) can be used to measure the signal strength of access points for the wireless local area networks within the shopping mall and generate a heat map of WiFi strength.

In one embodiment, the robot (101) is configured to perform autonomous scheduling of mapping and docking, without assistance from humans. For example, the robot (101) is programmed to un-dock at a defined frequency, collect/record mall data, re-dock and upload new content to be consumed via API remotely.

In one embodiment, the robot (101) includes a reader for radio frequency identification (RFID) tags. The robot (101) is configured to move into the retailer stores to scan RFID to obtain availability information items inside the store. For example, the scanning of the RFID tags allow the robot (101) to determine the presence of a particular item that is available for purchase at a particular location within a particular retailer store. The information is indexed for search, such that a user can quickly locate the item for inspection.

In one embodiment, the robot (101) includes a personal area network transceiver for transmitting a wireless signal (e.g., BLUETOOTH® transceiver) to perform a wireless docking connection with a dock station (137) when the robot (101) is with a predetermined distance to a docking station. The robot (101) may also move around the mall to measure BLUETOOTH® signals and/or detect BLUETOOTH® devices within the mall and correlate the detected signals/devices with the locations of the robot (101) at the time of the detection to generate a map of BLUETOOTH® signals/devices within the mall.

In some embodiments, the robot (101) also includes a user interface for a customer to search for product availability information, reserve products, inspect a map of the mall, and obtain instructions to a particular location of a particular retailer where an item of interest to the user is located.

FIG. 3 shows a robotic system according to one embodiment.

In FIG. 3, an intranet (131) interconnects one or more dock station (e.g., 137), a server (139), and a database (141). The database (143) stores location data (143) (e.g., a digital map of the shopping mall, a commercial district), and camera data (145) uploaded from the robots (101).

The robots (101) are programmed to travel within a predetermined area (the shopping mall, a commercial district) autonomously and capture camera data (145) using their cameras (109). The camera data (145) is location tagged for correlation with the retailer locations identified in the location data (143).

In one embodiment, the robot (101) has a memory configured to store the camera data (145) before the data is updated to the database (141) via the dock station (137). A robot (101) may connect with the dock station (137) via a wired connection (e.g., via a USB connector) or a wireless connection (e.g., via BLUETOOTH® or WiFi).

In FIG. 3, the server (139) provides a user interface (e.g., via a web server or a mobile application) that allows the users of the user devices (149, 151) to access the camera data (145).

For example, the 360 degree still or video images captured by the robot (101) allows a user of the user device (149) to view the shopping mall through the camera (109) of the robot (101) and thus obtain a virtual tour of the shopping mall. In one embodiment, the user interface is configured to receive instructions from a user to approach one of a set of authorized locations within the shopping mall to obtain a still image or a real time video feed from the camera (109) of the robot (101). The real time video, when presented via a virtual reality display device, provides a virtual reality experience in the shopping mall from a remote location. Thus, the robot (101) becomes a virtual representative of the user in the real world shopping mall, where the user may explore the merchandises provided in the shopping mall and make selections and purchases. A representative of a store may assist the robot (101) in completing certain operations, such as picking up an item for inspection, and purchase. The robot (101) transports the purchased items to a centralized location for shipping to the customer. Optionally, the customer may choose to travel to the centralized location to pick up the purchased items.

Further, in one embodiment, the server (139) (or the robot (101)) processes the camera data (145) to obtain postings (121) provided in a printed form on certain surfaces within the mall. For example, the discount offers are recognized via OCR and/or bar code; and thus, a discount offers can be communicated to the user devices (151) in various forms, such as advertisements, search results, a list of offers for browsing, etc.

Figure 4:
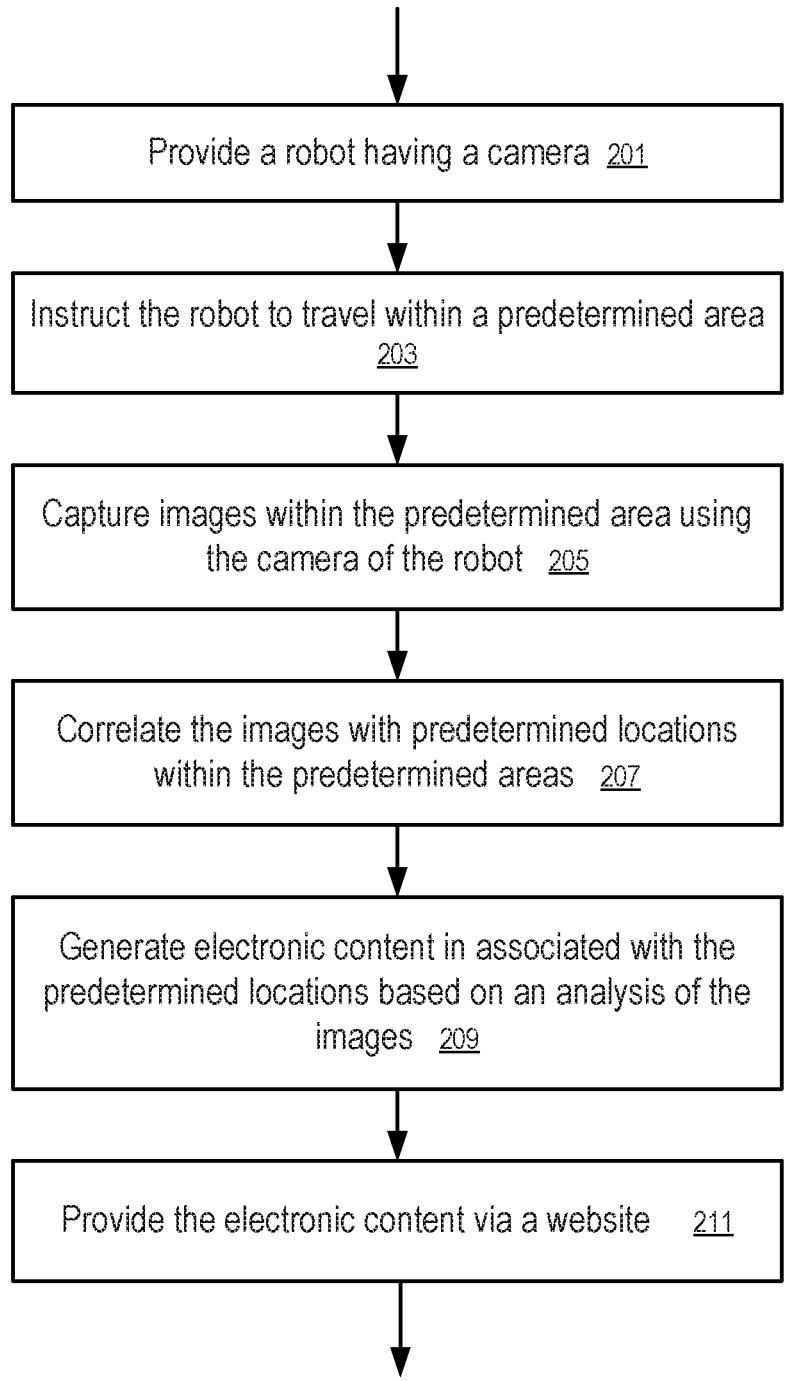
FIG. 4 shows a robotic method according to one embodiment.

FIG. 4 shows a robotic method according to one embodiment. For example, the method of FIG. 4 can be performed in a system illustrated in FIG. 3, using a robot (101) illustrated in FIG. 1 in an environment illustrated in FIG. 2.

In one embodiment, a robotic system is configure to: provide (201) a robot (101) having a camera (109); instruct (203) the robot (101) to travel within a predetermined area; capture (205) images within the predetermined area using the camera (109) of the robot (101); correlate (207) the images with predetermined locations within the predetermined areas; generate (209) electronic content in associated with the predetermined locations based on an analysis of the images; and provide (211) the electronic content via a website.

Figure 5:
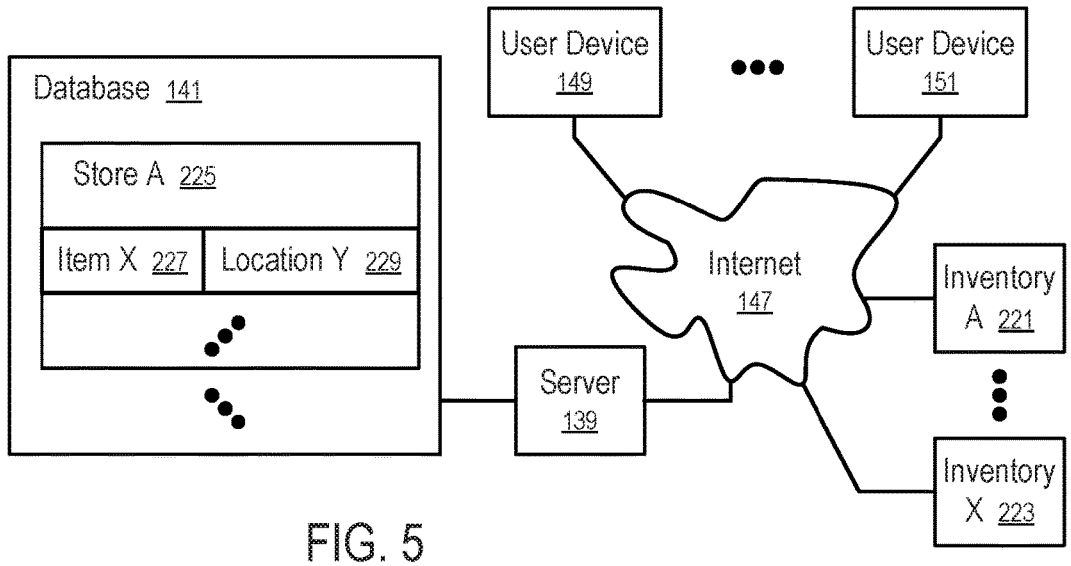
FIG. 5 shows a system configured to provide searchable content related to a plurality of locations in a region according to one embodiment.

FIG. 5 shows a system configured to provide searchable content related to a plurality of locations in a region according to one embodiment.

For example, a shopping mall configured in one or more connected buildings may be viewed as a warehouse for a plurality of stores located within the shopping mall, where the products and services offered by the stores are physically located within the warehouse and available at the warehouse during the business hours of the stores. However, conventional operations of the stores limit the access to the inventory of the warehouse during the business hours of the stores and limit the ability of the stores/retailers to move product faster and increase their sales volume.

In one embodiment, the server (139) is configured to provide information over a network to the user devices (149, . . . 151) to enhance the access to the inventory physically provided in the shopping mall.

For example, the server (139) is configured in one embodiment to provide an "On demand mall experience" where shoppers can utilize a search interface of the server (139) to not only access the live inventory within the business hours and outside the business hours of the stores, but also the products and/or services located in the physical stores in the mall. The server (139) provides navigational guidance to the shoppers to access the ordered products and/or services in the mall within and/or outside the business hours of the respective stores from which the items are ordered. For example, the server (139) allows a shopper to request the items to be reserved for pickup at a specific time, which may be within or outside the business hours of the store; and the navigational guidance is provided to guide the user to a location inside the store where the ordered item is disposed or an alternative location in the store for pickup. For example, the navigational guidance presents the shopper, or a delivery person, with information related to the best place to park their vehicle and most efficient way to navigate through the mall to access the ordered items. As a result, the shopper has enhanced physical access to the ordered items in the shopping mall even after the business hours of the respective store. In some embodiments, the shoppers are also provided with the options to have the ordered items delivered or shipped.

In FIG. 5, the server (139) is connected to a database (141) storing information about the items available for purchase in a plurality of different retailer stores within an enclosed regional shopping mall.

For examiner the database (141) is configured to include information showing that item X (227) is available for purchase from store A (225) within the shopping mall.

In one embodiment, the information stored in the database (141) identifies not only that the item X (227) is available for purchase in store A (225), but also the location Y (229) within the store A (225) where the user can find the item for inspection. The navigational guidance presented on the user device (149, . . . , or 151) not only guide the user to the store (225) in the mall, but also the location (229) within the store (225) where the item (227) is located. In some embodiments, the location (229) is also used to guide a robot (101) to fetch the item (227) from the location (229) to a designated location for pickup by the user, and/or the checkout location of the store to complete the purchase transaction; and after the robot (101) transports the item (227) to a new location, the robot (101) communicates with the server to update the data of the location (229) that is associated with the item (227), such that the navigational guidance can be provided to guide the user to the new location.

In FIG. 5, the server (139) provides a user interface, via a web page to be rendered by a browser in a user device (149), or a mobile application to be downloaded and executed in the user device (149), to facility the search of the items available for purchase in the shopping mall. After the server (139) receives a keyword, the server (139) searches the database to find marching items (e.g., 227) and presents, in the search result, the identifications of the marching items (e.g., 227), the retail stores (225) within the shopping mall that carry the items (e.g., 227), and optionally locations (e.g., 229) within the retail stores (225) where the items (e.g., 227) are accessible directly to the user. Alternatively, the user may browse the inventory organized according to stores and/or categories.

In one embodiment, if the user selects an item (227), the server (139) is configured to provide a set of instructions guiding the user to the location (229) in the store (225) within the shopping mall. The instructions may include a graphical map of shopping mall and/or the store (225); and the path is computed and presented on the map to guide the user from the current location of the user device (149) to the location (229) in the store (225).

In one embodiment, the server (139) is configured to query the inventory databases (221, . . . , 223) of the stores within the shopping mall and obtain the information about the items (e.g., 227) and/or their locations (e.g., 229).

For example, the server (139) may periodically communicate with each of the inventory databases (221, . . . , 223) of the retail stores to obtain the corresponding information maintained by the respective retailers. In some embodiments, the server (139) notifies a representative of a retailer store to scan the store for inventory information. For example, a handheld scanner is used in one embodiment to identify the items within the store tagged with radio frequency identification tags and their locations within the store. For example, a handheld scanner can be used in another embodiment to identify the items within the store via the recognition of barcodes and determine the locations of the items based on the positions of the scanner at the time of reading the bar codes. In some embodiments, the robot (101) is configured to carry the scanner to assist the representative to scan the store. In other embodiments, the robot (101) is configured to scan the store in an autonomous mode (with possible helps from the representative on occasions).

To balance the efficiency in data communication and accuracy of the content in the database (141), the server (139) is configured to schedule the queries of the inventory database (221, . . . , 223) of a retail store (225) based on a frequency that depends on the sales volume of the store (225). For example, when the volume of items sold in the store (225) is large, the frequency is increased to improve accuracy; and when the volume of items sold in a store (225) is small, the frequency is decreased to improve communication efficiency.

In some embodiments, the communication frequency (or the time interval between communications) is determined dynamically based on changes detected between two queries. When the changes are fewer than a threshold between two queries, the time period to next query can be increased from the previous time period for improved efficiency; and when the changes are more than the threshold between two queries, the time period to next query can be decreased from the previous time period to improve accuracy of the content database (141).

In one embodiment, the history of detected changes over a period of time are stored in the database (141) to determine a pattern of sales volume changes during the day and/or week. Thus, the predicted changes can be used to estimate a time period to next queries.

In some embodiments, the inventory systems of the merchants may report to the server (139) in real time the items being sold (purchased by customers) and thus update the database (141).

Some retail stores may not allow the server (139) to query the inventory database (e.g., 221) or does not maintain an online inventory database. The robot (101) can be used to visit the stores to collect information about the items available for in the respective stores.

For example, the robot (101) is configured in one embodiment to use the camera (109) to capture images of items presented for sale in a retail store. The images may include bar codes and/or text showing prices and description of items. The images are processed to generate the information about the item X (227) that is disposed at the location Y (229) in store A (225).

In some embodiments, the robot (101) also includes an RFID reader to scan for items labeled with RFID tags and presented in the retail store for sale. Thus, some of the content in the database (141) can be generated based on the scanning operation performed by the robot (101).

In FIG. 5, the server (139) provides a searchable mall. The server (139) aggregates product and inventory information for retailers in a brick and mortar shopping mall to provide a centralized location to search for items available for purchase within the shopping mall. The system as configured in FIG. 5 maximizes accuracy, efficiency and speed for product search. In order to offer its shoppers the most up-to-date and accurate inventory from retailers, the server (139) frequently interfaces with or "poll" the retailer's inventory management system for available products. To alleviate the infrastructure burden of over-polling a retailer's inventory database, the server (139) dynamically polls its retailers at variable intervals (more frequent polling of the higher volume retailers for the most accurate inventory). The system as configured in FIG. 5 enhances accuracy in storing, displaying and selling the available product inventory of regional malls and retail stores within these malls.

The technological advancements disclosed herein allow for: more accurate and up-to-date, tee-time inventory being available to users devices (149, 151), harmonizing communication with retail partners, reducing order processing delays and alleviating strains on retail stores; and overall enhancement of the shopper's experience, which can lead to more products sold and greater utilization of retailer's physical stores.

In one embodiment, the server (139) provides a user friendly interface for the live inventory of goods available for purchase in a physical, brick and mortar shopping mall. The server (139) posts available retail product inventory in accordance with the database (141), which includes a live inventory of available products from multiple retailers within the mall so that shoppers can view, select and purchase and subsequently reserve; ship or have delivered as demanded from multiple retailers at a single destination web site or mobile application. Retailers benefit because the distribution channels attract voluminous traffic broadening its retailer's ability to move product quicker and maximize the inventory from their stores. The technology further enables consumers to customize searches based on radius, region, preferred malls, and/or preferred retailers, or perform generic product searches, providing for a synergistic and user friendly clicks and bricks shopping experience.

In one embodiment, the user interfaces are provided via mobile applications running in user devices (149, . . . , 151) or web applications hosted on the server (139). The user interfaces allow the users to access the major retailers store's inventory within malls across the country. The user interfaces allow the users to shop by brand with in a given radius, shop by a given product within the mall, or specific retailer within specified mall. The user interfaces allow the aggregation of multiple products from multiple retailers into one shopping cart. The server (139) aggregates and manages availability and location information of the products, via communicating with the retailer inventory systems (e.g., 221, . . . , 223), and/or the use of robots (101) that travel to the retail stores autonomously.

For example, after a user opens a mobile application (or a web application) and provides location or an identification of a physical shopping mall, the user may specify search criteria, based on which the application pulls up malls within the region allowing the users then to either select a specific mall or search for inventory from a specified retailer in the area. If the user selects a mall, the user can search one particular retailer or search a type/style of products. The application allows the user to search by product; brand, location, retailer, and reserve products, select delivery options, or potential for service delivery.

In one embodiment, the user interfaces bridge the gap between supply chain management and customer relationship management/demand management.

As a result, consumers now have access to stores, which may or may not have their online stores, and malls within the region and can find the specific product from a particular retailer without having to drive to various malls to search the clothing racks or call stores and ask where they can find it. The system allows consumers to see every retailer that carries a particular product (i.e. black heels, pink dress, buckle shoes, etc.)

The system provides "on-demand" access to the inventory for all malls and retailers, has direct relationships with retailers and feeds from the merchants. The service of the server (139) is backed up with the physical stores carrying physical products, within the enclosure of the shopping mall.

Most malls are closed in the evening, which is when the majority of e-commerce shopping occurs. The server extends the presence of the brick and mortar shopping mall into the virtual online world.

In one embodiment, the location information is used to provide a way finding application that guides the user to the particular location (229) in a particular store (225) where a physical product is available for touching, feeling, trying, and inspection.

In one embodiment, additional technologies are provided to optimize routing for product delivery/pickup.

In aggregating the inventory of different stores into one channel, the server may charge consumers a fee for products purchased through the portal and charge all competing malls a fee to have their mall listed in the directory. This application brings sales in through the server (139) that would otherwise go directly to merchants and shipping companies. For example, the server may charge a lead origination fee. Further, the server provides data on transactions.

The system as configured in FIG. 5 takes operational friction out of on-boarding new malls, new shipping partners, and merchants. It provides an additional sales channel for merchants in participating malls and provides features not available to merchants in their existing online platforms and better insight into consumers shopping locally. It allows a customer to shop across multiple brands and fulfill in a single order.

In one embodiment, the database (141) provides a searchable, live inventory, which is accessible via a searchable mall user interface hosted on the server (139). The user interface provides an "On demand mall experience" available twenty four hours a day and seven days a week. The user interface can be used to search for products available in the mall, selectively order products, and have the ordered products delivered, shipped, or be picked up at a specific time identified by users of the user interface. The server (139) and/or the applications installed in the user devices (149, 151) are further configured with the database to provide a way finding feature that allows a shopper or delivery person to determine the best place to park at or near the mall and most efficient way to navigate through the mall to access all of the items for their order.

For example, shoppers will be able to select product from the live database within the searchable mall and add products to their cart. Once the shopping is completed the shopper can select the means by which they choose to receive the product. The shopper or delivery person will then be provided with the most efficient parking area and route to pick up all of the ordered products. Thus, the system provides the customers with a complete "on demand mall experience" where the customers have access to live inventory 24/7 to place orders, receive product when and where they want, and navigate the mall in the most efficient manner; and the system provides retailers a platform to allows customers to access the inventory that has otherwise been unavailable for purchasing or ordering outside of mall trading hours. This improves the turnover of product and increases volume. In addition, it will allow customers to quickly find the store(s) of their choosing and pick up their products.

Figure 6:
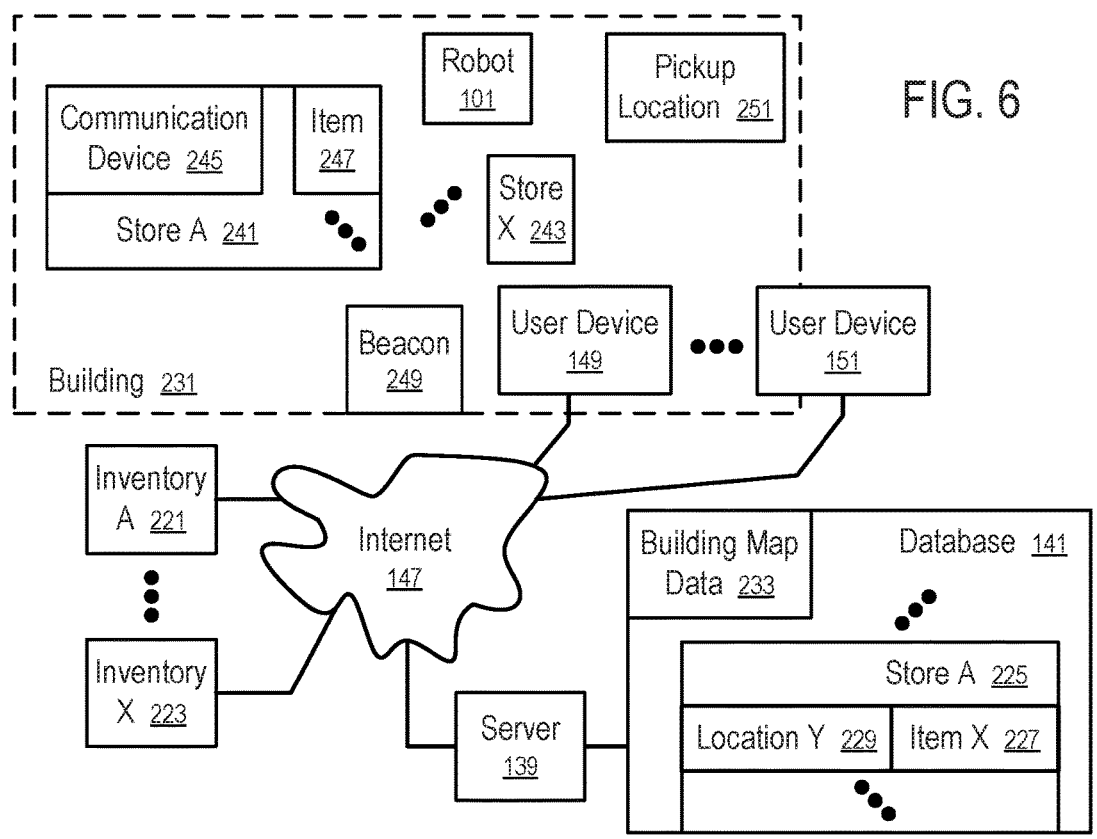
FIG. 6 shows a system configured to provide searchable content in connection with navigational guidance according to one embodiment.

FIG. 6 shows a system configured to provide searchable content n connection with navigational guidance according to one embodiment.

In FIG. 6, a user device (149, . . . , or 151) is configured with a user interface to may access the server (139) over the Internet (147) to search the database (141) for items (e.g., 227) for purchase and add selected items (e.g., 227) in an online shopping cart. Once the selection of items (e.g., 227) for purchase is completed, the user interface provides several options for the user to receive the ordered items.

In FIG. 6, the identification of store A (225) in the database (141) is for a physical store A (241) located in the building (231) (e.g., a shopping mall). The identification of item X (227) in the database (141) is for the item (247) physically positioned in the store (241) in the building (231); and the identification of location Y (229) stored in the database (141) corresponds to the physical location of the item (247) in the store A (241) within the building (231).

After the item X (227) is selected in the online shopping cart, the user may use the user interface to, for example, select the option of picking up the items from the physical store (241) in the building (231) during business hours and make the payment at that time, or the option of picking up the items from a designated pickup location (251) in the building (231) at a time that is outside the business hours of the store (241) (or inside the business hours of the store (241)). The user interface is also configured to provide the option of using a delivery service that picks up the items for delivery to an address of the user, and/or the option of shipping the ordered items to an address specified by the user.

In one embodiment, after the user chooses to access the item (247) at a facility (e.g., a store (241) or a pickup location (251)) within the mall (e.g., building (231)), the server (139) and/or a mobile application running inside the user device (149) is configured to provide navigational guidance to guide the user to the specific location in the facility, based on the current location of the user device (149) and the building map data (233) stored in the database (141). When the user device (149) is within the building (231), the navigational guidance of one embodiment is provided based at least in part on the use of beacons (e.g., 249) positioned in the building, as further discussed below in connection with FIGS. 7 and 8.

When the user chooses to inspect the item (247) before picking it up for checking out/purchase via a payment at the store, a navigational application computes the updated guidance from the current location of the user device (149) to the item (247) according to the location (229) stored in the database and the current location of the user device (149) during the trip to the location of the item (247). The navigation application of one embodiment is implemented as a mobile application running inside the user device (149) and/or a web service provided via the server (139).

Optionally, the user interface provides an option for an online inspection of the item (247) (e.g., before going to the store (241)). When such an option is selected, the server (139) dispatches a robot (101) (e.g., as configured in a way as illustrated in FIG. 1) to the location of the item (247) in the store (241) within the building (231) according to the location (229) stored in the database (141). When in the vicinity of the item (247), the robot (101) is configured to capture images of the item (247) from various viewing points (with or without the help of a representative of the store (241)) and communicates the image in real time to the user device.

If the user is satisfied with the online inspection of the item (247) and selects an option for pick up in the building (231), the server (139) of one embodiment instructs the robot (101) to carry the item (247) to a checkout location within the store (241) and/or process the payment for the item (247), which reduces the amount of processing time for the user when the user arrives in the building to pick up the item (247). Further, the user interface of one embodiment presents the option of arranging the item (247) to be picked up at a location within the store (241), the option of arranging the item to be picked up at a centralized pickup location (251) in the building (231).

In one embodiment, the pickup location (251) has extended business hours that allow the user to pick up the purchased items even after the business hours of the respective stores from which the items are purchased. For example, the pickup location (251) of one embodiment is configured with self-service lock boxes that allow the user to pick up the item (247) stored in a lock box without the help from a human operator.

For example, after the robot (101) fetches the item (247) from the store (241) to the lock box in the pickup location (251), the server (139) randomly generates a combination and sets the combination at the lock box in which the item (247) is stored. The server (139) communicates the combination to the user device (149) of the user. At the pickup location (251) the user enters the combination in the lock box to cause the lock box to open its door and then retrieves the item from the lock box. The door of the lock box may also be controlled by other automated mechanisms, such as a bar code presented on the screen of the user device and captured by a scanner or camera at the pickup location (251), a onetime code transmitted from the user device (149) to a controller of the lock box via near field communication at the pickup location (251), etc.

In FIG. 6, after the robot (101) fetches the item (247) from the store (241) to the lock box in the pickup location (251), the server (139) updates the data identifying the location (229) associated with the item X (227) in the database and thus causes the navigation application to guide the user to the new location of the item (247).

In one embodiment, the building (231) is configured to have multiple pickup locations (e.g., 251) that are strategically positioned near entrances of the building. The server (139) is configured to monitor the availability of parking spaces near the entrances and select a pickup location (e.g., 251) based on the availability of the parking spaces near the entrances. Alternatively, information about the availability of parking spaces is presented on the user device (149) via the navigation application; and the user may request, via the navigation application, to transfer the item (247) to a pickup location (e.g., 251) selected by the user. After the robot (101) transports the purchased items to the pickup location (251), the user of the navigation application (e.g., the shopper or a delivery person) can pick up the items purchased from different stores in the building with one trip to the single pickup location (251). Further, when the user is shopping within the building, the user may use the user interface to complete the purchase online, causing the purchased items to be delivered (e.g., via the robot (101)) to a convenient pick up location (251) for retrieval at a convenient time (e.g., a time to leave the building), such that the user does not have to carry the items around within the building during shopping.

In some embodiments, the stores (e.g., 241) in the building (231) is configured with a shared warehouse that is configured to allow the robot (101) to automatically pick up the items from their storage locations and transport the items to the lock boxes in the pickup locations (e.g., 251).

In one embodiment, the server (139) is configured to perform online checkout of the items (e.g., 227) in the online shopping cart. After the online payment is processed via the online shopping cart system, the server (139) generates communications to the representatives of the respective stores (e.g., 241) to reserve the items for pickup. The communications can be transmitted via fax, email, text message, etc. Alternatively or in combination, the server (139) is configured to dispatch robots (101) to the stores, or the shared warehouse, to collect the items (247), perform checkout at the stores (e.g., 241), and/or transport the items to the pickup locations (251).

In one embodiment, during the trips to pick up the items purchased by the users via the online shopping cart system, the robots (101) survey the inventory of remaining items available in the stores, or a section of a store or the shared warehouse, via the use of the camera (109) and/or RFID reader. The robots (101) communicate with the server (139) to update the inventory information stored in the database (141), including the currently available items and their locations.

In one embodiment, a system is configured to provide improved position determination results by distributing beacon devices at pedestrian traffic "choke points", such as door entrances, elevator entrances and tops and bottoms of escalators, to obtain a very precise position of the mobile device (e.g., user devices (149, . . . , 151)) based on the radio frequency power measurement of the beacon devices positioned at these choke points. The results can be used to correct the positions of the mobile device determined using other technologies, such as providing an initial position to be used by an inertial navigation system to track the location of the mobile device, correcting the drift in the tracked location provided by the inertial navigation system, imprecision of Wi-Fi and beacon fingerprinting, and/or providing a much more accurate and robust positioning method.

Figure 7:
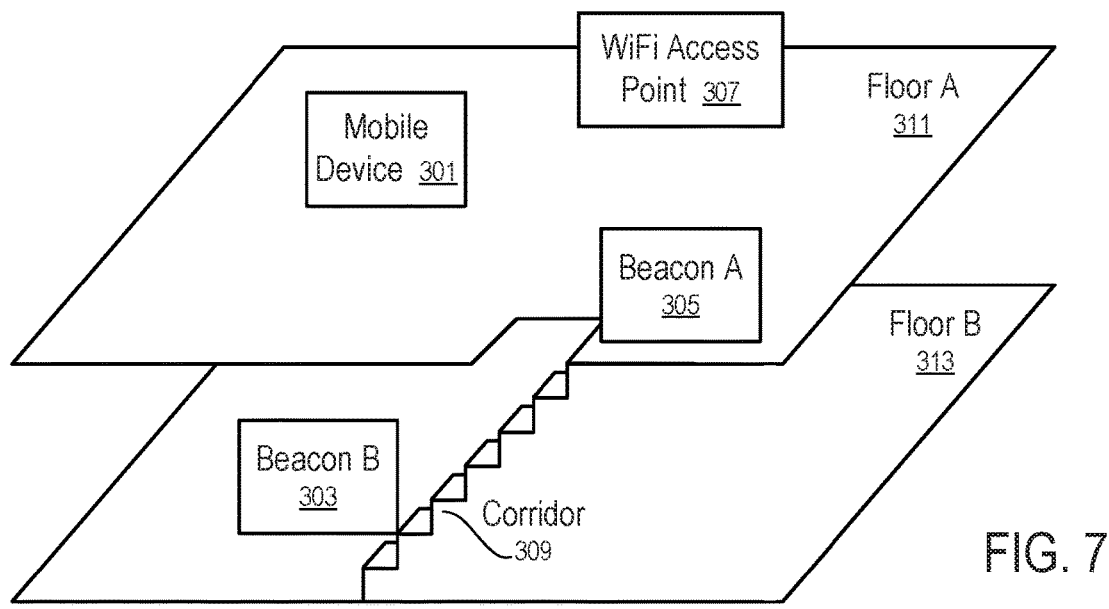
FIG. 7 shows a system configured to determine a position of a mobile device in an indoor environment according to one embodiment.

FIG. 7 shows a system configured to determine a position of a mobile device in an indoor environment according to one embodiment.

In FIG. 7, the position of the mobile device (301) in a multi-floor indoor environment is determined and/or tracked via the use of beacons (303 and 305) disposed at selected locations of a transport corridor (309), such as the top and bottom of an escalator or a stairway, the entrances of an elevator connecting between the floors (311 and 313), etc.

In FIG. 7, the direction of the location of one beacon B (303) to the location of another beacon A (305) corresponds to the direction of traffic flow on the corridor (309). The transport corridor (309) substantially confines the possible locations of the mobile device (301) on one or more predefined line segments identified by the locations of the beacons (303, 305), if the mobile device (301) is determined to be in the traffic on the corridor (309). Thus, detecting the mobile device (301) being in the traffic simplifies the position determination of the mobile device (301) and improves the accuracy of the determined position.

In FIG. 7, the mobile device (301) is configured to receive signals from the beacons (303 and 305) and monitor the signal strength of the received beacon signals. When the mobile device (301) moves pass a beacon (e.g., 305), the strength of the signal received from the beacon (305) reaches a peak and then drops off from the peak. The time instance at which the beacon signal reaches the peak corresponds to the moment where the mobile device (301) is the closest to the location of the beacon (305).

In general, the mobile device (301) may move close to the beacon (305) and then move away from the beacon (305), causing the mobile device (301) to detect a peak in beacon signal, without actually moving to the location of the beacon (305).

When the mobile device (301) detects that a peak in signal strength from the beacon A (305) and then a peak in signal strength from the beacon B (303), the mobile device (301) determines that the movement of the mobile device (301) is consistent with the traffic flow in the transport corridor (309).

Furthermore, in one embodiment, the time gap between the peak in signal strength from the beacon A (305) and the peak in signal strength from the beacon B (303) is determined to be the travel time from the vicinity of beacon A (305) to the vicinity of beacon B (303). The time gap can be compared with the time gap of expected traffic flowing through the transport corridor (309). If the time gaps match with each other, the determination of the mobile device (301) moving along the corridor (309) during the time period between the signal peaks can be confirmed.

For example, when the corridor (309) is an escalator, the expected traffic flow can be determined based on the speed of the escalator. For example, when the corridor (309) is an elevator, the expected traffic flow can be determined from the speed of the elevator. For example, when the corridor (309) is a stairway, an average traffic flow speed can be measured for the stairway to determine a typical time gap for traveling from the vicinity of the beacon A (305) to the vicinity of the beacon B (303).

When the time gap between the peak in signal strength from the beacon A (305) and the peak in signal strength from the beacon B (303) is consistent with the expected traffic flowing through the transport corridor (309), the mobile device (301) is determined to have traveled between the locations of the beacon A (305) and the beacon B (303). Thus, the travel speed and position of the mobile device (301) during the time period between the peaks in beacon signal strength are determined in relation with the known path of the corridor (309) with great precision.

The determined position and the travel speed can be used to augment the performance of other indoor positioning systems.

For example, in one embodiment, the mobile device (301) further includes an inertial guidance system that uses motion sensors, such as accelerometers and gyroscopes, to calculate, via dead reckoning, the position, orientation, and velocity (including the direction and speed of movement) of the mobile device (301). For example, the acceleration over a period of time provides the change in the speed of the mobile device (301); and the speed of the mobile device (301) over a period of time provides the change in the position of the mobile device (301).

The determined position and the travel speed of the mobile device (301) on the corridor (309) can be used to provide an initial position and/or the speed for the inertial guidance system to determine, using the measurements from the motion sensors, the subsequent local and spend of the mobile device (301) after the mobile device moves away from the corridor (309).

For example, when the mobile device (301) moves to the next corridor (309), or travels back via the corridor (309), the determined position and the travel speed of the mobile device (301) on the corridor (309) can be used again to reset the position and/or the speed of the mobile device (301) for subsequent location tracking via the inertial guidance system. Thus, each time the mobile device (301) moves through a corridor (309) with the correspondingly equipped beacon sets (303 and 305), the mobile device (301) can reinitialize the inertial guidance system to correct drift in the results provided by the inertial guidance system.

In an embodiment in which the corridor (309) is an elevator, a signal beacon (305) may be installed inside the elevator. When the mobile device (301) enters the elevator, the beacon signal strength reaches a highest level and stay at the level during the time period of the elevator traveling from one floor (313) to another floor (311). When the mobile device leaves the elevator, the beacon signal strength drops off from the highest level. Thus, from correlating the timing of the beacon signal strength reaching the highest level and dropping off from the highest level with the time of the travel of the elevator, the speed and position of the mobile device (301) within the elevator can be determined in great accuracy. The floor position of the elevator can be used to accurately identify the position of the elevator. In some embodiments, the beacon signal may include the data reporting the floor position of the elevator. Alternatively, multiple beacons (305, 303) can be placed at the exit locations of the elevator in a way as beacons being placed on or near an escalator or stairway.

In some embodiments, the mobile device (301) also includes a radio frequency fingerprint-based location determination system. For example, a distribution of radio frequency fingerprints of the indoor environment can be obtained via a survey operation. Different locations inside the multi-floor environment generally have different radio frequency fingerprints and different relations with neighboring locations. Thus, when the mobile device (301) moves around the environment and measures the radio frequency fingerprints, the measured radio frequency fingerprints can be correlated with the predetermined distribution of radio frequency fingerprints to determine a location of the mobile device (301).

In some embodiments, different floors of the indoor environments may have similar distribution of radio frequency fingerprints. Thus, the radio frequency fingerprint-based location determination system may have difficulties in determine accurately the floor on which the mobile device (301) is currently located. The determination of the mobile device (301) moving through the corridor (309) provides the accurate information about the floor on which the mobile device (301) is currently located and thus, allows the radio frequency fingerprint-based location determination system to correlate the measured radio frequency fingerprints with the distribution of the correct floor to provide accurate result with reduced correlation time.

In one embodiment, the mobile device (301) is configured to combine the results from the multiple positioning systems to provide an improved overall estimate of the position of the mobile device (301).

For example, in one embodiment, when the mobile device (301) travels through the corridor (309), the accurate position and speed of the mobile device (301) can be used to provide the initial position and speed of the mobile device (301) for the inertial guidance system that uses the measurement of the motion sensors to updated subsequent location and speed of the mobile device (301). After a period of time, the drift in the inertial guidance system may lead to increased errors in the determined location and speed of the mobile device (301). Thus, after a threshold period of time, if the inertial guidance system cannot be reset via the positioning results from traveling through a corridor equipped with the beacons (303, 305), the mobile device (301) may use the location results from the radio frequency fingerprint-based location determination system.

In one embodiment, the accuracy of the results from the radio frequency fingerprint-based location determination system are associated with the locations calculated by matching the measured radio frequency fingerprints with the predetermined distribution of radio frequency fingerprints; and the accuracy of the results from the inertial guidance system are determined from the lapsed time from the initialization using an accurate result from the beacons (303, 305) installed near the corridor (309). When the result of the radio frequency fingerprint-based location determination system is more than a threshold better than the result of the inertial guidance system, the result from the inertial guidance system is discarded; when the result of the radio frequency fingerprint-based location determination system is more than a threshold worse than the result of the inertial guidance system, the result from the radio frequency fingerprint-based location determination system is discarded; and otherwise, the result of the radio frequency fingerprint-based location determination system and the result of the inertial guidance system are combined (e.g., via an weighted average, where the weights for the results from the different systems are proportional to the estimated accuracy of the respective results).

In one embodiment, the flaws of the individual measuring system (e.g., the inertial guidance system, the radio frequency fingerprint-based location determination system, and the chock-point-beacon-based system) are eliminated by the mobile device (or a remote server) examining in real time the data of each individual systems, using the known propensity of the types of errors that one system produce and the real time data produced by another system to eliminate the types of errors.

As an example, a radio frequency fingerprint-based location determination system has the propensity to jump the reported position yet reporting a correct heading of the mobile device. The person may or may not be actually turning to the jump location. An inertial system does not report positions with this type of positioning errors. Therefore, when a jump signature is recognized in the reported positioning results of a radio frequency fingerprint-based location determination system, a solution integration engine is configured to eliminate the faulty position provided by the radio frequency fingerprint-based location determination system and utilizing the position determined by the inertial guidance system.

Meantime the inertial system has a tendency to drift, which is recognized by the solution integration engine. Once a series of high quality positions has been received which have not had any recognized error artifact and the inertial system is exhibiting its drift tendency away from those high quality positions determined by the radio frequency fingerprint-based location determination system, the inertial system can be reset/initialized according to the positions determined by the radio frequency fingerprint-based location determination system, and/or creating a composite heading figure using the data from both systems.

Thus, one embodiment of the disclosure includes a position correction technique and system calibration technique based on the known error signatures and tendencies of individual positioning systems used by the mobile device (or a remote server).

Figure 8:
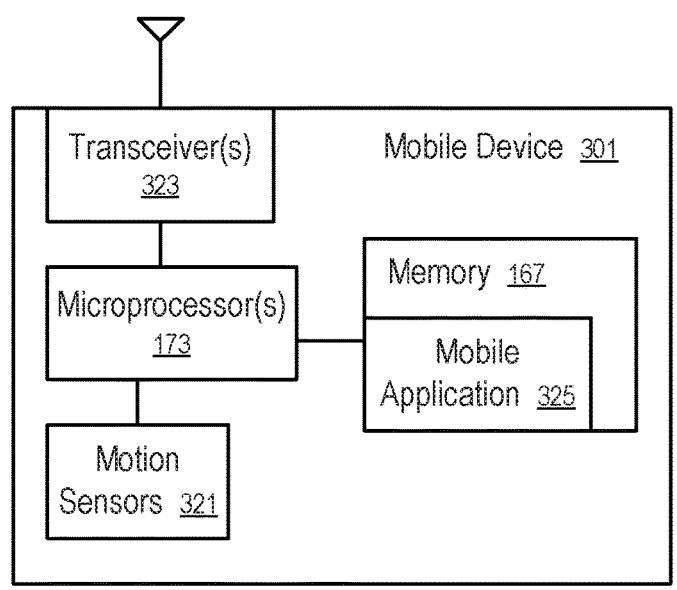
FIG. 8 shows a mobile device for its location determination according to one embodiment.

FIG. 8 shows a mobile device for its location determination according to one embodiment. In FIG. 8, the mobile device (301) includes one or more transceivers (323) to receive signals from the beacons (303, 305) to detect the peaks of their signals corresponding to the travel of the mobile device (301) between the locations of the beacons.

In one embodiment, one or more transceivers (323) are further used to communicate with the Wi-Fi access points (e.g., 307) in the environment to support radio frequency fingerprint-based location estimation.

In FIG. 8, the mobile device (301) further includes motion sensors (321), such as accelerometers and gyroscopes to support inertial guidance based location estimation The mobile device (301) includes a memory (167) storing a mobile application (325) having instructions configured to instruct one or more microprocessor(s) (173) to receive measurement results from the transceiver(s) (323) and the motion sensors (321), and determine the position of the mobile device (301) in a way as discussed above in connection with FIG. 7.

In one memory (167) further stores data such as the distribution of radio frequency fingerprints in the indoor environment, the locations of beacons (303, 305); etc.

In some embodiments, the beacons (303 and 305) broadcast not only their identities, but also related data, such as the location of the beacons (330 and 305), the expected travel speed of the corridor (309), etc.

In the above discussion, the peak beacon signal strength is determined by the mobile device (301) receiving the beacon signals from the beacons (303; 305). Alternatively, the mobile device (301) may transmit the beacon signals to the corresponding beacons (303, 305), which are connected to a centralized server to compute the location of the mobile device (301). Similarly, the mobile device (301) may provide the radio frequency fingerprint measurements to the server for a determination of the location of the mobile device (301).

In one embodiment, the mobile device (301) is configured to: provide a first beacon device at a first location of a transport corridor in a multi-floor environment; provide a second beacon device at a second location of the transport corridor; determine the mobile device being in the vicinity of the first location at a first time instance based on a peak of beacon signal power received from the first beacon device; determine the mobile device being in the vicinity of the second location at a second time instance based on a peak of beacon signal power received from the second beacon device; correlate the movement of the mobile device from the first location to the second location with a predetermined traffic speed along the corridor; and determine a position and/or a speed of the mobile device at a time instance based on the movement of the mobile device from the first location to the second location along the corridor.

The systems and methods discussed above use fewer beacons to be deployed; relative to a solution not employing this method, to achieve continuous, high-accuracy positioning results. Results of the systems and method are generally more accurate than the results of a radio frequency fingerprint-based location estimate or an inertial guidance location estimate.

Precise positioning (defined here as within 1-2 meters 90% of the time) has yet to be reliably achieved. This level of accuracy consistently allows for a vastly improved user experience when navigating a large indoor space such as a shopping center. It allows more precise targeting of communications within the space. For example, assuming the consumer has opted in to receive such messages and/or promotions, with this level of consistent positioning fidelity, a retailer could send a communication or promotion to a specific consumer as she walked by the storefront of the retailer. Such real-time, highly-contextual messaging and promotion is more valuable to advertisers than is general or even "area-based" messaging.

Additionally, there is value for shopping center owners in understanding traffic flows within their centers, in order to 1)

promote leasing efforts, and, 2) better understand both individual and aggregate shopper behavior (e.g., gaining a precise understanding of who goes where, and how long they spend in each location and in transit) to better merchandise store mix within the center. The solution as described should allow the precision necessary to acquire positioning data with a very small margin of error, unlike many other solutions.

One embodiment disclosed in the present application includes a system and method to compute the most efficient route for a user of a mobile device, such as a consumer, a runner, or a delivery person, or a robot to locate a package that has been pre-purchased and stored/staged for pickup. The system uses a combination of low-energy BLUETOOTH® beacon devices that communicate their identifiers within their communication ranges and a database containing the location information of the BLUETOOTH® beacon devices, such as the coordinates (e.g., longitude, latitude, and altitude) of at least some of the BLUETOOTH® beacon devices.

The BLUETOOTH® beacon devices have a limited range for providing their identifiers via wireless communications. For example, class 1 BLUETOOTH® devices have a typical range of 1 meter; and class 2 BLUETOOTH® devices have a typical range of 10 meters. When a wireless communication from a BLUETOOTH® device is received in a mobile device, the location of the mobile device can be determined based on the location of the BLUETOOTH® device, with an accuracy corresponding to the communication range.

For example, two sets of BLUETOOTH® beacon devices can be used to identify locations. A first set of stationary BLUETOOTH® beacon devices is placed throughout a facility (e.g., a shopping mall) in which the packages are located. The stationary BLUETOOTH® beacon devices in the first set are used to identify the locations at which these devices are placed respectively. A second set of mobile BLUETOOTH® beacon devices is attached to the packages. The mobile BLUETOOTH® beacon devices in the second set are used to identify the current locations of packages in relation with the stationary BLUETOOTH® beacon devices is. By extracting the identifiers from wireless communications received by a mobile device from the beacon devices, the system links to the location of the mobile device, the locations of the packages identified by the mobile BLUETOOTH® beacon devices, and the locations of the stationary beacon devices, based which navigational guidance is provide to direct the user of the mobile device to a given package.

For example, the coordinates of each BLUETOOTH® beacon device in the first set are recorded in a database in association with the identifier of the corresponding BLUETOOTH® beacon device. Each BLUETOOTH® beacon device has a unique identifier among the BLUETOOTH® beacon devices used in the facility. Each BLUETOOTH® beacon device transmits its unique identifier within its wireless communication range. At least one BLUETOOTH® beacon device in the first set is positioned such that an area for the staging of a package for delivery is within its communication range. The database stores the coordinates of the BLUETOOTH® beacon device in the staging area, its identifier, and optionally other data, such as human-readable labels for entries, exits, room locations, loading docks, etc. Different beacon devices in the first set are placed in different staging areas and/or on pathways in the facility to the stage areas.

In addition to the fixed/positional/stationary BLUETOOTH® beacon devices in the first set, the database also stores records of identifiers of the package-mounted, mobile BLUETOOTH® beacon devices in the second set. For example, for a given identification of a package, a record in the database shows an identifier of the BLUETOOTH® beacon device attached to or mounted on the package. The position of the package-mounted BLUETOOTH® beacon device is identified using the identifiers of one or more fixed/positional/stationary BLUETOOTH® beacon devices in the first set that can communicate to a mobile device at a location where the mobile device can also communicate with the package-mounted BLUETOOTH® beacon device, which indicates that the positions of the package-mounted BLUETOOTH® beacon device and the one or more fixed/positional/stationary BLUETOOTH® beacon devices in the first set are all within the communication range from the mobile device. Thus, the relationship of the package-mounted BLUETOOTH® beacon device and the one or more fixed/positional/stationary BLUETOOTH® beacon devices as being within the communication range from the mobile device can be used to estimate the location of the package-mounted BLUETOOTH® beacon device, without a need to accurately measure the coordinates of the package and/or the package-mounted BLUETOOTH® beacon device.

For example, at the time of packaging and staging, a BLUETOOTH® beacon device is attached to the package. The BLUETOOTH® beacon device may have electrical power before attachment to the package or it may be provided with electrical power at the time of attachment. When ready for pickup, the BLUETOOTH® beacon device attached to the package is scanned with a device capable of detecting BLUETOOTH® beacon devices and their identifiers. The scanning device detects the identifier of the BLUETOOTH® beacon device attached to the package, and at the same time, the identifier of a fixed/positional/stationary BLUETOOTH® beacon device mounted in the vicinity of the package. The scanning device may have electrical power constantly running, or the device may be provided with electrical power only at the time of staging the package for delivery. The scanning device capturing these signals from the BLUETOOTH® beacon devices transmits a record of the identifiers of the detected BLUETOOTH® beacon devices to store in the database with the date and time of the scanning. In addition to the identifiers of the detected BLUETOOTH® beacon devices, the device can optionally record other relevant identifiers regarding the contents of the package, such as shipping codes, purchaser information, transaction information, and/or information of the retail store. These additional identifiers can be used by a central application running on a server coupled with the data base to facilitate the pickup of the package.

For example, some of these additional identifiers can be transmitted to the customer/purchaser/runner/delivery person before the person entering the facility or upon entering the facility, such that the person may use the information to identify the package and request for navigational guidance to reach the package.

For example, a mobile device of the person of one embodiment uses the package information to request the central application running on the server to identify the current location of the package. The human-readable labels for entries, exits, room locations, loading docks, etc. of the fixed/positional/stationary BLUETOOTH® beacon device that is associated with the package-mounted BLUETOOTH® beacon device can be presented to provide a description of the location of the package.

Further, once the person carrying the mobile device enters the facility, the mobile device detects a fixed/positional/stationary BLUETOOTH® beacon device that in communication range from the current position of the mobile device and uses the location of the fixed/positional/stationary BLUETOOTH® beacon device to estimate the current location of the mobile device. Based on the current location of the mobile device carried by the person and the location of the package, the mobile device and/or the server computes a route within the facility, from the current location of the mobile device to the location of the package. To facilitate the most efficient route to locate the package, the central application and/or on an application running in the mobile device is configured to determine the shortest vectors between the coordinates recorded in the database for the fixed/positional/stationary BLUETOOTH® beacon device that is in communication range from the mobile device and for the fixed/positional/stationary BLUETOOTH® beacon device associated with the package that was in communication range with the scanning device during the scanning of the package in the staging area.

As the mobile device carried by the person (or in some instances the mobile device is integrated with or mounted on a robot) moves through the facility, the identifiers of the fixed/positional/stationary BLUETOOTH® beacon devices that are closest to the mobile device are captured or detected by the mobile device (or the robot); and the optimal route to the package is recalculated and/or updated.

Once the mobile device carried by the person (or the robot) is within the communication range of the BLUETOOTH® beacon device attached to the package, the mobile device (or the robot) captures the identifier of the package-mounted BLUETOOTH® beacon device. The mobile device alerts the person (or the robot) that the package is present, and optionally provides the instructions for retrieving the package at the location. The mobile device transmits the identifier of the package-mount BLUETOOTH® beacon device to the central application to indicate that the person (or the robot) has located the package.

Additional operations can be used to obtain indications that the person (or the robot) is in possession of the package. For example, the mobile device of one embodiment is configured to instruct the person (or the robot) carrying the mobile device to tap the package with the mobile device, which causes a near field communication between the mobile device and the beacon device based on close proximity between the mobile device and the beacon device (e.g., using a near field communication technique). Alternatively, the mobile device of one embodiment is configured to present a user interface that instructs its user to provide an input to acknowledge that the user is in possession of the package, which causes the mobile device to transmit a signal to the package-mount BLUETOOTH® beacon device to stop transmitting its identifier and/or change its transmission. When a robot retrieves the package, the robot is configured to automatically provide the input to acknowledge its possession of the package and/or transmit a signal to the package-mount BLUETOOTH® beacon device to stop transmitting its identifier and/or change its transmission. In some embodiments, the robot retrieves the package and provides the package to a person; and the robot is configured to authenticate the person before releasing the package to the person and generate the input and/or signal after releasing the package to the person.

In one embodiment, upon retrieval of the package by the person, the central application and/or the application running in the mobile device of the person (or robot) directs the person (or robot) to a point of origin of the package and/or any additional locations in the facility, such as the locations of other packages that have other BLUETOOTH® beacon devices attached therein to facilitate the navigation guidance to reach their respective locations, locations within the facility identified by other fixed/positional/stationary BLUETOOTH® beacon devices for the processing of the packages.

For example, the fixed/positional/stationary BLUETOOTH® beacon devices can be positioned to mark the locations of exits, loading docks for packages, pathway intersections, elevators, escalators, staging areas of the packages, lock box areas in centralized pickup areas, package processing locations in retail stores, etc.

Upon the package leaving the facility, the BLUETOOTH® beacon devices attached to the package may be removed, or may remain attached but silenced and/or disabled.

In some embodiments, the mobile device detects and/or reports the identifiers of the fixed/positional/stationary BLUETOOTH® beacon devices it detects while the mobile device is within the communication range from the package-mounted BLUETOOTH® beacon devices, which identify the path of the package traveling with the mobile device and thus an indication that the person (or robot) carrying the mobile device is in possession of the package. When there is sufficient indication that the person (or robot) carrying the mobile device is in possession of the package, the central application and/or the application running in the mobile device can instruct the package-mounted BLUETOOTH® beacon devices to stop their operations.

Figure 9:
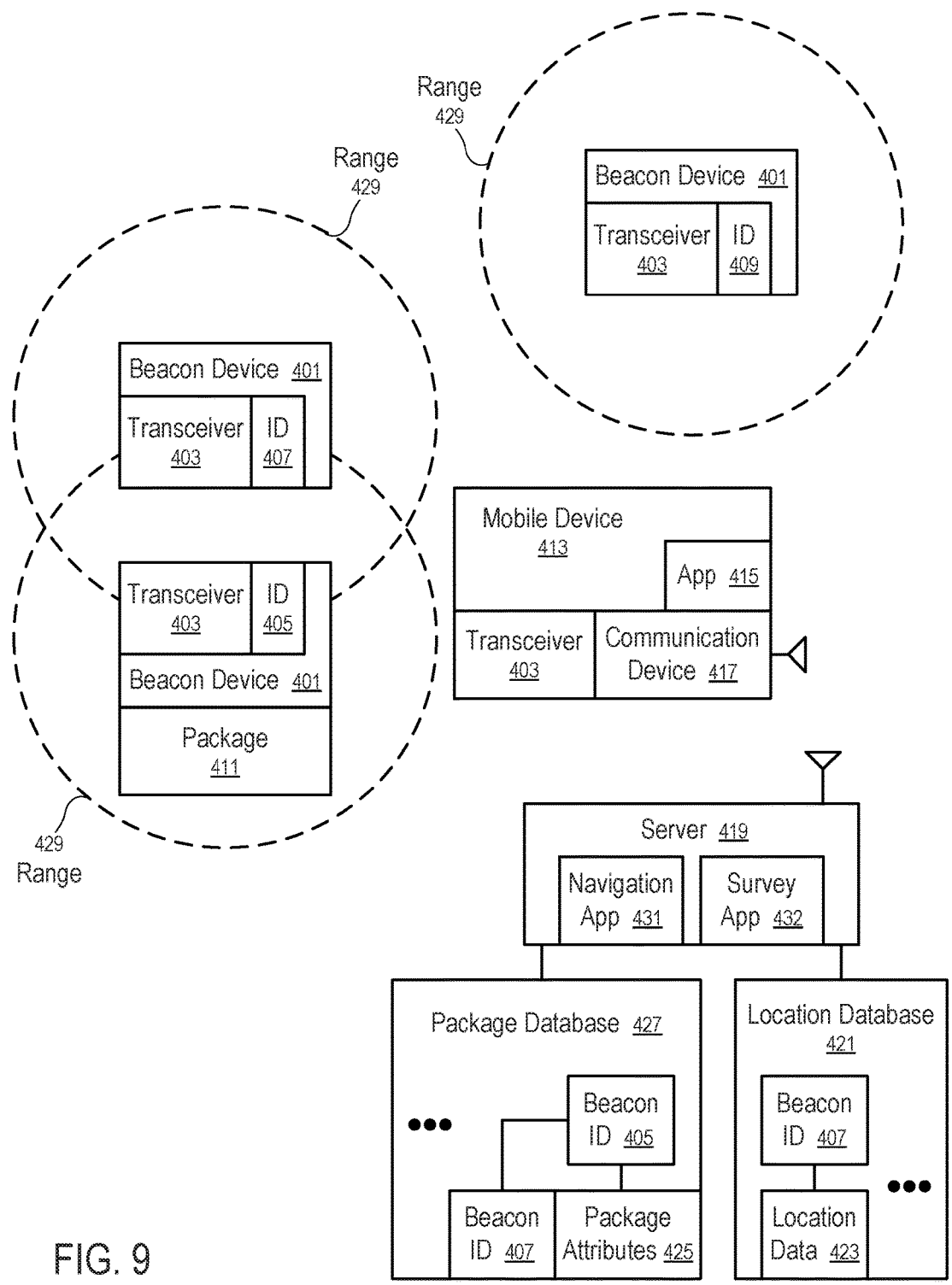
FIG. 9 shows a system to identify locations and provide navigational guidance according to one embodiment.

FIG. 9 shows a system to identify locations and provide navigational guidance according to one embodiment.

In FIG. 9, the system includes stationary beacon devices (401) disposed at various locations in a facility (e.g., a shopping mall) to mark the respective locations. A location database (421) is configured to the location data of the stationary beacon devices (401).

For example, in FIG. 9, a data record is stored to associate the beacon ID (407) of a beacon device (401) that is disposed at a particular location identified by the location data (423). The location data (423) may include a set of coordinates of the location of the beacon device (401) having the beacon ID (407), and/or a description of the location of the beacon device (401).

For example, the mobile device (301) as illustrated in FIGS. 7 and 8 is used to determine its location using the position determination system as discussed in connection with FIGS. 7 and 8. When the mobile device (301) is at the location of the beacon device (401) having the beacon ID (407) (e.g., being positioned next to or in close proximity to the beacon device (401)), the mobile device (301) communicates with the transceiver (403) of the beacon device (401) to obtain the beacon ID (407) and determine its location. The mobile device (301) is further configured to provide a user interface to allow its user to provide a name for the beacon device and/or a description of the location, such as the floor level, area identification within the floor, a business name of the location, etc. to form the location data (423) for the beacon ID (407). The mobile device (301) transmits the beacon ID (407) and its location (and the location description) to the server (419) to store in the location database (421) a data record associating the beacon ID (407) and the location data (423). In some embodiments, the locations of the stationary beacon devices (401) are determined based on measurements of the locations of the stationary beacon devices (401) in relation with architectural features of the facility, such as the walls, pathways, gates, doors, windows, etc.

In FIG. 9, each of the beacon devices (401) has a limited communication range within the facility, corresponding to the communication range (407) of the transceiver (403) for providing their IDs (e.g., 407, 409, 411). Thus, when a mobile device (413) is communicating with a beacon device (401) to obtain its beacon ID, the mobile device (413) is within a local area in the facility defined by the location of the beacon device (401) and its communication range.

In general, the local areas of the stationary beacon devices (401) may or may not overlap with each other. Further, the precise radii and/or areas of the different stationary beacon devices may not be exactly the same. One or more nominal communication ranges (429) can be used to approximate the local areas. In some embodiments, the mobile device (301) is moved around the facility to perform a survey of the communication range and generate a map of the signal strength of the transceivers (403) of the stationary beacon devices (401) and/or their communication ranges (429). Thus, based on the signal strength determined by the mobile device (413), an estimate of the location of the mobile device (413) can be computed. The estimation of the location of the mobile device (413) can be further improved using the system as disclosed in connection with FIGS. 7 and 8.

In FIG. 9, mobile beacon devices (401) are attached to packages (e.g., 411) that are ready for pickup or transport. For example, to indicate that the package (411) is attached to the beacon device (401) having the beacon ID (405), the mobile application (415) configured in the mobile device (413) obtains the beacon ID (405) from the transceiver (403) of the beacon device (401) and presents a user interface to receive user input to identify attributes (425) of the package (411), such as a unique package ID assigned by the server (419) to the package (411), an order confirmation number of the package (411), date and time of the purchase order of the package (411), an identifier of the merchant selling the package (411), and/or an identifier of the customer purchasing the package (411) (e.g., name, phone number, customer number, an email address), etc. The mobile device (413) communicates the beacon ID (405) and the package attributes (425) to the server (419) to store a record associating the beacon ID (405) and the package attributes (425) such that the package (411) can be identified via the beacon ID (405) and the beacon ID (405) for the package can be looked up via the package attributes (425) from the package database (427).

In FIG. 9, the location of the mobile beacon device (401) attached to the package is identified via the identification of the stationary beacon devices (401).

For example, when the mobile device (413) is in communication range from both the stationary beacon device (401) having the ID (407) and the mobile beacon device (401) having the ID (405), the location of the package (411) having the mobile beacon device (401) is represented by the local area of the stationary beacon device (401) having the ID (407); and the application (415) of the mobile device (413) communicates with the survey application (432) in the server (419) to generate a data record associating the beacon IDs (405 and 407) in the package database (427). Thus, the combination of the package database (427) and the location database (421) provides the location data (423) that identifies the approximate location of the package, with an accuracy corresponding to the communication range of the beacon devices (401).

In one embodiment, when the package (411) having the beacon device (401) attached therein is transported within the facility (e.g., a shopping mall), the mobile device (413) is transported with the package (411) to detect the stationary beacon devices (401) encounter on the trip and thus, generate a record of the transportation path of the package (411). Thus, the last stationary beacon device (401) reported by the mobile device (413) that was transported with the package (411) represents the current storage location of the package (411).

In some embodiments, the robot (101) as illustrated in FIG. 1 is equipped with, or used to carry, the mobile device (413) to detect the beacon IDs (e.g., 405, 407, 409) in the facility and generate records associate beacon IDs (e.g., 405 and 407) that can be obtained at a same location. Thus, the locations of the packages can be updated as the robot (101) runs the survey trip.

In FIG. 9, the mobile device (413) can be implemented via installing the mobile application (415) on a device (413) having the transceiver (403) for communication with the transceivers (403) of the beacon devices and a communication device (417) for communication with the server (419) (e.g., via a wireless location area network connection, or a cellular data communication connection). The application (415) can be installed on a mobile device (413) of a manager/administrator/operator of the facility, an employee/cashier/owner of a retailer store in the facility, etc. to communicate with the survey application (432) of the server (419) to generate the data records in the location database (421) and/or the package database (427).

A mobile device (413) of a customer/purchaser/runner/delivery person, or a robot, to pick up the package (411) can be similarly configured to have a mobile application (415) to communicate with the navigation application (431) of the sever (419) to obtain navigational guidance to reach the package (411) from the current location of the mobile device (413).

When the mobile device (413) is within the local area of a stationary beacon device (401) within the facility, the mobile device (413) extracts the beacon ID (e.g., 407 or 409) from the wireless transmissions of the beacon device (401) and communicates with the server (419) to determine an estimated position of the mobile device (413). The mobile application (415) is configured with a user interface that allows the user of the mobile device (413) to enter one or more of the attributes (425) of the package (411) to look up the ID (405) of the mobile beacon device (401) attached to the package, the ID (407) of the stationary beacon device (401) that is associated with the mobile beacon device (401) having the ID (405), and the location data (423) of the ID (407) of the corresponding stationary beacon device (401) that is associated with the mobile beacon device (401) attached to the package (411). The location data (423) provides a destination location; and the navigation application (431) is configured to provide turn-by-turn navigation guidance for the user to reach the package (411).

FIG. 9 illustrates a mobile device (413) as an example. In general, different mobile devices (e.g., 413) can be installed with the application (415) configured to communicate with the navigation application (431) of the server (419) to assist their users to locate their packages; and different mobile devices (e.g., 413) can be installed with the application (415) configured to communicate with the survey application (432) of the server (419) to assist their users to generate the location records in the location database (432) and/or the package database records (427). In some embodiments, the application (415) is capable of communication with both the navigation application (431) and the survey application (432) and is configured to provide the survey function and/or the navigation function based on the identity of the user of the mobile application (415) and/or the function request from the user.

Figure 10:
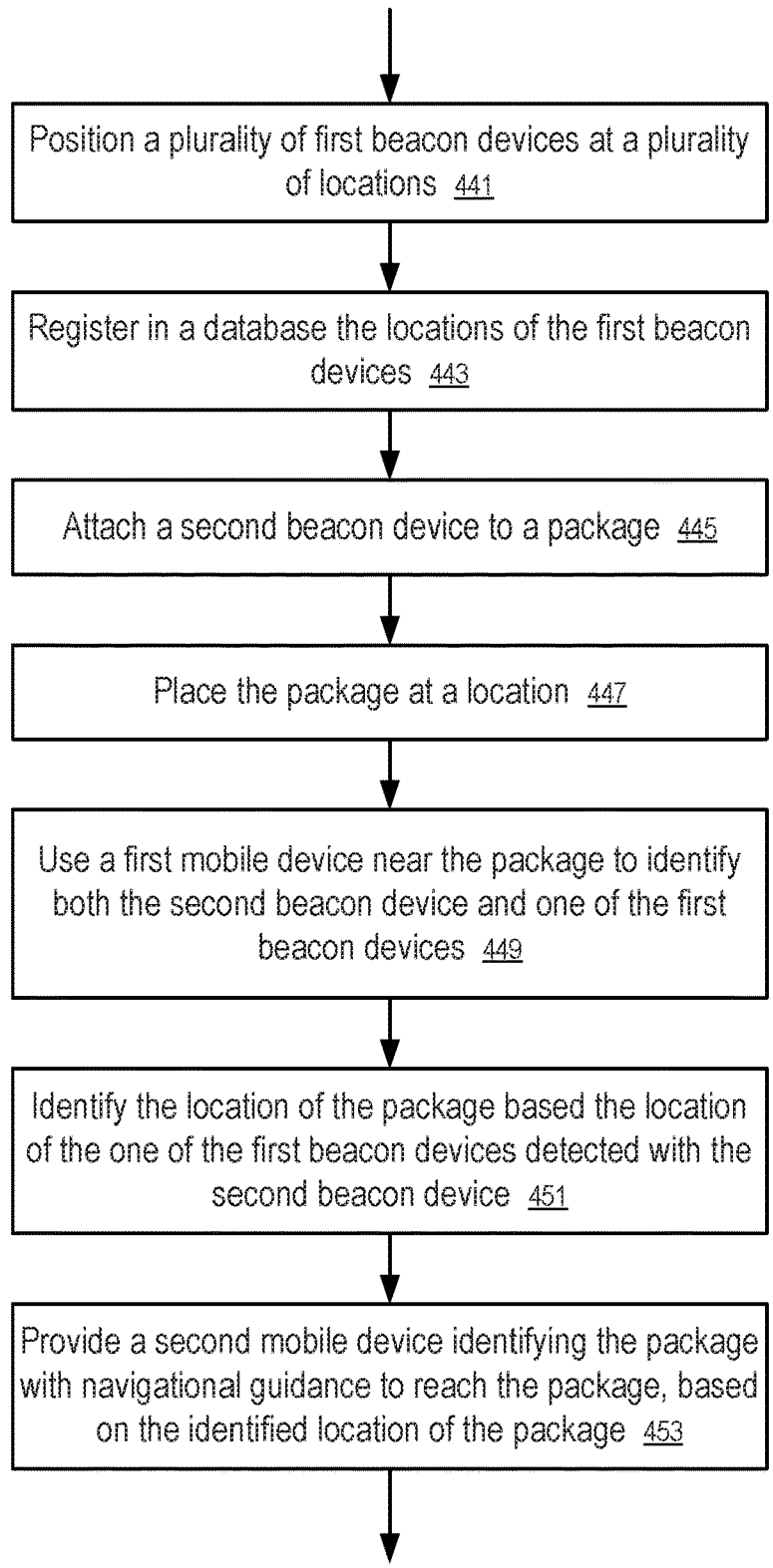
FIG. 10 shows a method to identify locations and provide navigational guidance according to one embodiment.

FIG. 10 shows a method to identify locations and provide navigational guidance according to one embodiment. For example, the method of FIG. 10 can be implemented in the system illustrated in FIG. 9.

In FIG. 10, a computing apparatus is configured to: position (441) a plurality of first beacon devices (401) at a plurality of locations; register (443) in a database (421) the locations of the first beacon devices (401); attach (445) a second beacon device (401) to a package (411); place (447) the package (411) at a location; use (449) a first mobile device near the package (411) to identify both the second beacon device (401) and one of the first beacon devices (401); identify (451) the location of the package (411) based the location of the one of the first beacon devices detected with the second beacon device; and provide (453) a second mobile device identifying the package (411) with navigational guidance to reach the package (411), based on the identified location of the package (411).

For example, a plurality of beacon devices (401) are provided at a plurality of locations, where each respective beacon device (401) in the plurality of beacon devices includes: a memory storing an identifier (e.g., 407, . . . , 409) of the respective beacon device (401); and a transmitter (e.g., 403) configured to wirelessly provide the identifier within a predetermined communication range (429) from the respective beacon device (401).

At least one database (e.g., 421 and 427) stores location data (e.g., 423) of the plurality of stationary beacon devices (401), where the location data (423) associates, for the respective beacon device, the identifier (e.g., 407) of the respective beacon device (401), and an identification of a location of the respective beacon device, such as the coordinates of the location, a description of the location, etc.

The first mobile device, positioned within the communication range (429) from the package (4110 having an attached first beacon device (401) that is separate from the plurality of beacon devices (401), receives wireless communications from transmitters of beacon devices (403), including transmissions from the first beacon device attached to the package (411) and transmissions from a second beacon device among the plurality of stationary beacon devices (401). The first mobile device extracts, from the wireless transmissions, an identifier (405) of the first, package-mount beacon device and an identifier (407) of the second, stationary beacon device.

The first mobile device communicates with the survey application (432) of the server (419) to store, in the at least one database (421 and 4270, package data associating: an identification of the package (e.g., package attributes (425)); the identifier (425) of the first beacon device representative of the package (411) having attached there on the first beacon device; and the identifier (407) of the second beacon device indicative of a location of the package based on the location data (423).

After a second mobile device identifies the package using one or more of the package attributes (425), the navigation application (431) of the server (419) communicates with the second mobile device to provide navigational guidance to reach the package based on: a location of the second mobile device, and the identification of the location of the second, stationary beacon device associated with the identifier of the second beacon device in the location data.

For example, the second mobile device may use the identifier of a stationary beacon device that is within the communication range from the second mobile device to determine/estimate the current location of the second mobile device. For example, after the second mobile device receives second wireless communications from at least a third beacon device, among the plurality of stationary beacon devices, that is within the predetermined communication range from the second mobile device, the second mobile device extracts, from the second wireless communications, an identifier of the third beacon device and communicates with the navigation application (431) of the server (419) to determine the location of the second mobile device based at the identification of the location of the third beacon device associated with the identifier of the third beacon device in the location data stored in the location database (421).

For example, the second mobile device (e.g, 413) is configured with a mobile application (415) to: detect identifiers of the plurality of beacon devices located within the communication range from the second mobile device during a trip to the package (411); and transmit the detected identifiers to the server (419) coupled with the at least one database (421, 427) to receive real time navigational guidance to reach the location of the package within a building, such as an enclosed shopping mall.

In one embodiment, the wireless communications from the transceivers (403) of the beacon devices (401) to the transceivers (403) of the mobile devices (413) are in accordance with a standard for wireless personal area networks, such as a BLUETOOTH® standard. Each of the beacon devices (401) includes a power source to transmit the identifier (e.g., 405, 407, and 409) of the respective beacon device (401) to the mobile devices (e.g. 413).

In one embodiment, the stationary beacon devices (401) are provided at the plurality of locations in an indoor environment in a shopping mall. At a time the first, mobile beacon device (401) is attached to the package (411), a mobile device (413) is used to reading the identifier (405) of the first, mobile beacon device (401) and obtain package attributes (425) for transmission to the survey application (432) of the server (419), causing the server (419) to store data associating the identifier (405) of the first, mobile beacon device (401) with the identification of the package (411). At time the package (411) is disposed at a location within the predetermined communication range (429) from the second, stationary beacon device (401) for storage, the mobile device (413) (or another mobile device) extracts the identifiers (405 and 407) of the first and second beacon devices (401) and communicates with the survey application (432) of the server (419) to store in the package database (427) a data record to associate the identifiers (405 and 407) of the first and second beacon devices (401).

In one embodiment, the first mobile device is transported with the package to the location at which the package is disposed, and the first mobile device is configured to report a sequence of identifiers of the stationary beacon devices observed by the first mobile device during a trip to the location at which the package is disposed. The sequence of identifiers and their associated location data (423) in the location database (421) provides the path of the travel of the package.

In one embodiment, after the mobile device (413) is provided with the navigational guidance to reach the package (411), the user of the mobile device (413) may pick up the package (411) and travel with the package (411) and the mobile device (413). The mobile device (413) reports the sequence of stationary beacon devices (401) detected by the mobile device (413) while the mobile beacon device (401) is within the communication range from the mobile device (413). When the travel pattern is uniquely associated with the mobile device (413), it can be concluded that the user of the mobile device (413) is in possession of the package (411). Alternatively, or in combination, the mobile application (415) is configured to instruction to provide an input to indicate that the user is in possession of the package (411), e.g., via a tapping action causing a near field communication between the mobile device 9413) and the mobile beacon device (401) attached to the package (411), via pushing a graphical user interface button in the mobile application, etc.

Figure 11:
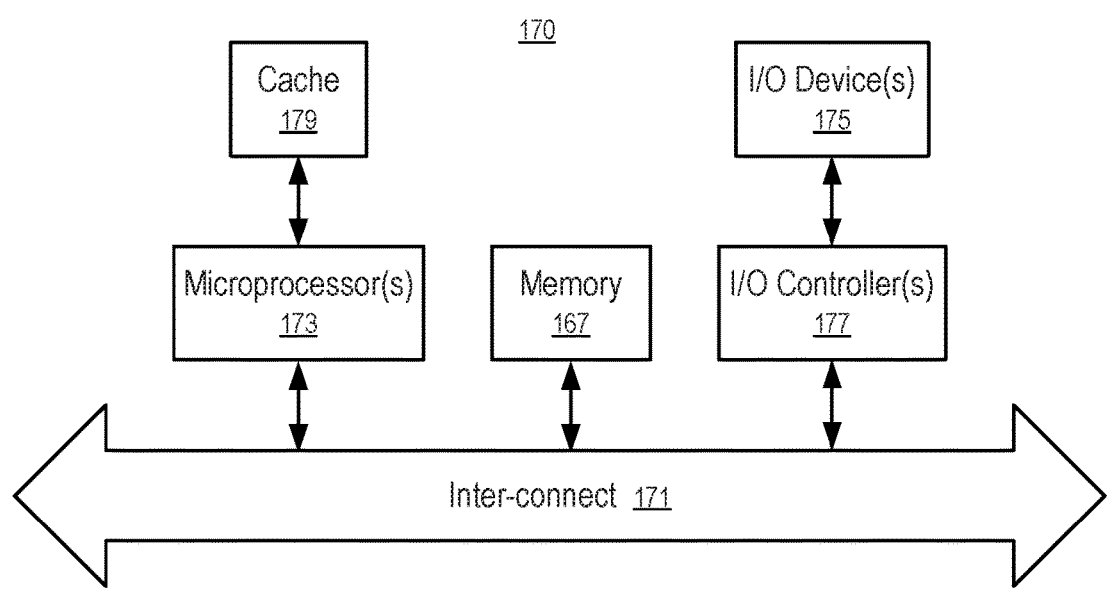
FIG. 11 shows a data processing system that can be used to implement some components of a system according to one embodiment.

FIG. 11 shows a data processing system that can be used to implement some components of a robotic system according to one embodiment. For example, the data processing system of FIG. 11 can be used to implement each of the controller of the robot (101), the dock station (137), the server (139 or 419), and/or the database (141, 427, 421), the mobile devices (301 or 413) discussed above.

While FIG. 11 illustrates various components of a computer system, it is not intended to represent any particular architecture or manner of interconnecting the components. One embodiment may use other systems that have fewer or more components than those shown in FIG. 11.

In FIG. 11, the data processing system (170) includes an inter-connect (171) (e.g., bus and system core logic), which interconnects a microprocessor(s) (173) and memory (167). The microprocessor (173) is coupled to cache memory (179) in the example of FIG. 11.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   storing, in at least one database, location data and identifier data of a plurality of beacon devices in a region;
   receiving, in a transceiver of a first mobile device, wireless communications emitted from a first beacon device and a second beacon device, wherein the first beacon device is attached to a package and is separate from the plurality of beacon devices, and wherein the second beacon device is from the plurality of beacon devices and is indicative of a location of the package;
   retrieving, from the wireless communications of the first beacon device and the second beacon device, identifier data of the first beacon device and identifier data of the second beacon device;
   retrieving, from the at least one database, location data of the second beacon device based on the retrieved identifier data of the second beacon device; and
   providing, to a second mobile device, navigational guidance to reach the package based at least on a location of the second mobile device and the location data of the second beacon device.

2. The method of claim 1, further comprising:
   receiving, in the second mobile device, wireless communications emitted from a third beacon device, wherein the third beacon device is from the plurality of beacon devices and is within a predetermined communication range of the second mobile device;
   retrieving, from the wireless communications of the third beacon device, identifier data of the third beacon device;
   retrieving, from the at least one database, location data of the third beacon device based on the retrieved identifier data of the third beacon device; and
   determining the location of the second mobile device based on the location data of the third beacon device.

3. The method of claim 2, wherein the second mobile device is configured with a mobile application to:
   detect identifier data of the plurality of beacon devices located within the communication range of the second mobile device during a trip to the package, and
   transmit the detected identifier data to a server computer coupled with the at least one database to receive real time navigational guidance to reach the location of the package within a building.

4. The method of claim 1, wherein the wireless communications are in accordance with a standard for wireless personal area networks.

5. The method of claim 4, wherein the standard for wireless personal area networks includes a BLUETOOTH® standard.

6. The method of claim 1, wherein the first beacon device includes a power source to transmit the identifier data of the first beacon device.

7. The method of claim 1, wherein the region of the plurality of beacon devices comprises an indoor environment in a shopping mall.

8. The method of claim 1, further comprising:
   reading the identifier data of the first beacon device during a period in which the first beacon device is attached to the package; and
   transmitting data to the at least one database to associate the identifier data of the first beacon device with the identifier data of the package.

9. The method of claim 1, wherein the receiving of the wireless communications is performed at a time the package is left at a location within a predetermined communication range of the second beacon device for storage.

10. The method of claim 9, wherein the first mobile device is transported with the package to the location where the package is left, and the first mobile device is configured to report identifier data of one or more of the plurality of beacon devices observed by the first mobile device during a trip to the location at which the package is disposed.

11. A system for providing navigational guidance for reaching a package, the system configurable to cause:
 storing, in at least one database, location data and identifier data of a plurality of beacon devices in a region;
 receiving, in a transceiver of a first mobile device, wireless communications emitted from a first beacon device and a second beacon device, wherein the first beacon device is attached to a package and is separate from the plurality of beacon devices, and wherein the second beacon device is from the plurality of beacon devices and is indicative of a location of the package;
 retrieving, from the wireless communications of the first beacon device and the second beacon device, identifier data of the first beacon device and identifier data of the second beacon device;
 retrieving, from the at least one database, location data of the second beacon device based on the retrieved identifier data of the second beacon device; and
 providing, to a second mobile device, navigational guidance to reach the package based at least on a location of the second mobile device and the location data of the second beacon device.

12. The system of claim 11, further configurable to cause:
 receiving, in the second mobile device, wireless communications emitted from a third beacon device, wherein the third beacon device is from the plurality of beacon devices and is within a predetermined communication range of the second mobile device;
 retrieving, from the wireless communications of the third beacon device, identifier data of the third beacon device;
 retrieving, from the at least one database, location data of the third beacon device based on the retrieved identifier data of the third beacon device; and
 determining the location of the second mobile device based on the location data of the third beacon device.

13. The system of claim 12, wherein the second mobile device is configured with a mobile application to:
 detect identifier data of the plurality of beacon devices located within the communication range of the second mobile device during a trip to the package, and
 transmit the detected identifier data to a server computer coupled with the at least one database to receive real time navigational guidance to reach the location of the package within a building.

14. The system of claim 11, wherein the wireless communications are in accordance with a standard for wireless personal area networks.

15. The system of claim 11, wherein the first beacon device includes a power source to transmit the identifier data of the first beacon device.

16. The system of claim 11, wherein the region of the plurality of beacon devices comprises an indoor environment in a shopping mall.

17. The system of claim 11, further configurable to cause:
 reading the identifier data of the first beacon device during a period in which the first beacon device is attached to the package; and
 transmitting data to the at least one database to associate the identifier data of the first beacon device with the identifier data of the package.

18. At least one non-transitory computer readable storage medium having computer program instructions stored thereon and configured to cause:
 storing, in at least one database, location data and identifier data of a plurality of beacon devices in a region;
 receiving, in a transceiver of a first mobile device, wireless communications emitted from a first beacon device and a second beacon device, wherein the first beacon device is attached to a package and is separate from the plurality of beacon devices, and wherein the second beacon device is from the plurality of beacon devices and is indicative of a location of the package;
 retrieving, from the wireless communications of the first beacon device and the second beacon device, identifier data of the first beacon device and identifier data of the second beacon device;
 retrieving, from the at least one database, location data of the second beacon device based on the retrieved identifier data of the second beacon device; and
 providing, to a second mobile device, navigational guidance to reach the package based at least on a location of the second mobile device and the location data of the second beacon device.

19. The at least one non-transitory computer readable storage medium of claim 18, the computer program instructions further configured to cause:
 receiving, in the second mobile device, wireless communications emitted from a third beacon device, wherein the third beacon device is from the plurality of beacon devices and is within a predetermined communication range of the second mobile device;
 retrieving, from the wireless communications of the third beacon device, identifier data of the third beacon device;
 retrieving, from the at least one database, location data of the third beacon device based on the retrieved identifier data of the third beacon device; and
 determining the location of the second mobile device based on the location data of the third beacon device.

20. The at least one non-transitory computer readable storage medium of claim 19, wherein the second mobile device is configured with a mobile application to:
 detect identifier data of the plurality of beacon devices located within the communication range of the second mobile device during a trip to the package, and
 transmit the detected identifier data to a server computer coupled with the at least one database to receive real time navigational guidance to reach the location of the package within a building.

* * * * *